United States Patent
Chintalapati et al.

(10) Patent No.: US 11,367,034 B2
(45) Date of Patent: Jun. 21, 2022

(54) TECHNIQUES FOR DATA-DRIVEN CORRELATION OF METRICS

(71) Applicant: Oracle International Corporation, Redwood Shores, CA (US)

(72) Inventors: Renu Chintalapati, San Ramon, CA (US); Manisha Gupta, San Ramon, CA (US); Ashlesh Bajpai, Fremont, CA (US); David Granholm, Edina, MN (US); Stefan Schmitz, Redwood City, CA (US); Naren Chawla, Pleasanton, CA (US); Matthew Bedin, Denver, CO (US); Jacques Vigeant, Fort Lauderdale, FL (US); Ananth Venkata, San Ramon, CA (US); Rajesh Balu, Bangalore (IN); Vikas Agrawal, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 16/586,347

(22) Filed: Sep. 27, 2019

(65) Prior Publication Data
US 2020/0104775 A1 Apr. 2, 2020

Related U.S. Application Data

(60) Provisional application No. 62/855,218, filed on May 31, 2019, provisional application No. 62/737,518, filed on Sep. 27, 2018.

(51) Int. Cl.
*G06Q 10/06* (2012.01)
*G06F 9/451* (2018.01)
(Continued)

(52) U.S. Cl.
CPC ..... *G06Q 10/06393* (2013.01); *G06F 3/0482* (2013.01); *G06F 9/451* (2018.02); *G06T 11/206* (2013.01); *G06T 2200/24* (2013.01)

(58) Field of Classification Search
CPC ...... G06F 3/0482; G06F 9/451; G06T 11/206; G06T 2200/24; G06Q 10/06393
See application file for complete search history.

(56) References Cited

U.S. PATENT DOCUMENTS 5,642,519 A 6/1997 Martin
5,717,828 A 2/1998 Rothenberg
(Continued)

FOREIGN PATENT DOCUMENTS

EP 3309689 A1 4/2018
JP 2013109364 6/2013
(Continued)

OTHER PUBLICATIONS

Lundberg et al., "A Unified Approach to Interpreting Model Predictions," 31st Conference on Neural Information Processing Systems, Nov. 25, 2017 (10 pages) (Year: 2017).*
(Continued)

*Primary Examiner* — Eric J. Bycer
(74) *Attorney, Agent, or Firm* — Kilpatrick Townsend & Stockton LLP

(57) ABSTRACT

Described herein are techniques for identifying highly relevant content for a user to view in the form of KPI cards and providing the relevant view to the user automatically or by suggestion. The KPIs of highest practical and statistical significance are provided when the user accesses the user interface. In some embodiments, when the user is viewing a KPI, other relevant KPIs may be provided for the user to view as suggestions. Further, in some embodiments, the user may be provided with the KPIs of significance based on
(Continued)

anomaly detection, and the explanation for the anomaly as well as suggestions for remedying any issues may be provided to the user. The highly informational content can be surfaced through the use of the advanced machine learning algorithms described herein.

20 Claims, 16 Drawing Sheets

(51) Int. Cl.
*G06T 11/20* (2006.01)
*G06F 3/0482* (2013.01)

(56) References Cited

U.S. PATENT DOCUMENTS

| | | | |
|---|---|---|---|
| 5,754,681 | A | 5/1998 | Watanabe et al. |
| 5,966,690 | A | 10/1999 | Fujita et al. |
| 6,995,768 | B2* | 2/2006 | Jou .................. G06F 9/542 345/440 |
| 7,801,769 | B1 | 9/2010 | Kelly et al. |
| 7,869,989 | B1 | 1/2011 | Harvey et al. |
| 8,200,527 | B1 | 6/2012 | Thompson et al. |
| 8,620,716 | B2* | 12/2013 | Nicholls ............ G06Q 10/10 705/7.29 |
| 8,824,337 | B1 | 9/2014 | Geisberger |
| 9,208,231 | B1 | 12/2015 | Upstill et al. |
| 9,911,094 | B1 | 3/2018 | Chen et al. |
| 10,210,548 | B1 | 2/2019 | Wai |
| 2006/0046232 | A1 | 3/2006 | Peter |
| 2006/0241923 | A1 | 10/2006 | Xu et al. |
| 2008/0124686 | A1 | 5/2008 | Forman |
| 2008/0199075 | A1 | 8/2008 | Gokturk et al. |
| 2008/0313000 | A1 | 12/2008 | Degeratu et al. |
| 2009/0083019 | A1* | 3/2009 | Nasle .................. G06F 30/18 703/18 |
| 2009/0132450 | A1 | 5/2009 | Schlottmann |
| 2009/0276296 | A1 | 11/2009 | Spriegel |
| 2010/0036606 | A1 | 2/2010 | Jones |
| 2010/0049538 | A1 | 2/2010 | Frazer et al. |
| 2010/0223212 | A1 | 9/2010 | Manolescu et al. |
| 2010/0233663 | A1 | 9/2010 | Pennington et al. |
| 2011/0131082 | A1 | 6/2011 | Manser et al. |
| 2011/0161139 | A1 | 6/2011 | Maheshwari et al. |
| 2011/0261049 | A1* | 10/2011 | Cardno ............... G06Q 10/10 345/419 |
| 2011/0311129 | A1 | 12/2011 | Milanfar et al. |
| 2012/0053995 | A1 | 3/2012 | D'Albis et al. |
| 2012/0066017 | A1 | 3/2012 | Siegel |
| 2012/0102396 | A1* | 4/2012 | Arksey ............... G06F 40/106 715/273 |
| 2012/0158301 | A1 | 6/2012 | Schilling et al. |
| 2013/0018824 | A1 | 1/2013 | Ghani et al. |
| 2013/0024249 | A1 | 1/2013 | Zohar et al. |
| 2013/0261965 | A1 | 10/2013 | Delling et al. |
| 2013/0261966 | A1 | 10/2013 | Wang et al. |
| 2014/0157142 | A1 | 6/2014 | Heinrich et al. |
| 2014/0258189 | A1 | 9/2014 | Schmidt |
| 2014/0282261 | A1* | 9/2014 | Ranz .................. G06F 3/0482 715/838 |
| 2014/0358602 | A1 | 12/2014 | Jones |
| 2015/0012471 | A1 | 1/2015 | Efrat et al. |
| 2015/0113056 | A1 | 4/2015 | Srinivasan et al. |
| 2015/0120608 | A1* | 4/2015 | Leftwich ............. G06Q 40/06 705/36 R |
| 2015/0206443 | A1 | 7/2015 | Aylesworth et al. |
| 2015/0229661 | A1 | 8/2015 | Balabine et al. |
| 2015/0234869 | A1 | 8/2015 | Chan et al. |
| 2015/0363798 | A1 | 12/2015 | Aihara et al. |
| 2016/0057207 | A1 | 2/2016 | Li et al. |
| 2016/0092530 | A1* | 3/2016 | Jakubiak ............. G06F 16/26 715/202 |
| 2016/0170610 | A1* | 6/2016 | Bertram ............. G06Q 10/10 715/845 |
| 2016/0171540 | A1 | 6/2016 | Mangipudi et al. |
| 2016/0239768 | A1 | 8/2016 | Jones |
| 2016/0379083 | A1 | 12/2016 | Sala et al. |
| 2017/0116624 | A1 | 4/2017 | Moore et al. |
| 2017/0124581 | A1 | 5/2017 | Wilson et al. |
| 2017/0243140 | A1 | 8/2017 | Achin et al. |
| 2017/0344927 | A1 | 11/2017 | Coletta et al. |
| 2017/0372695 | A1 | 12/2017 | Takei et al. |
| 2018/0046926 | A1 | 2/2018 | Achin et al. |
| 2018/0046987 | A1 | 2/2018 | Goren et al. |
| 2018/0060744 | A1 | 3/2018 | Achin et al. |
| 2018/0114128 | A1 | 4/2018 | Libert et al. |
| 2018/0253655 | A1 | 9/2018 | Wang et al. |
| 2018/0268082 | A1 | 9/2018 | Latzina |
| 2018/0276861 | A1* | 9/2018 | Wright ................ G06N 3/0454 |
| 2018/0349474 | A1 | 12/2018 | Smith et al. |
| 2018/0365229 | A1 | 12/2018 | Buhrmann et al. |
| 2019/0066056 | A1 | 2/2019 | Gomez et al. |
| 2019/0104041 | A1* | 4/2019 | Tabak .............. G06Q 10/06315 |
| 2019/0156216 | A1* | 5/2019 | Gupta .................... G06N 5/045 |
| 2019/0186928 | A1 | 6/2019 | Blandin et al. |
| 2019/0188289 | A1 | 6/2019 | Suzuki et al. |
| 2019/0188605 | A1* | 6/2019 | Zavesky ................ G06N 20/00 |
| 2019/0197605 | A1 | 6/2019 | Sadler et al. |
| 2019/0220153 | A1* | 7/2019 | Kidron ............. G06Q 10/06393 |
| 2019/0268233 | A1* | 8/2019 | Singh ............... G06Q 10/06393 |
| 2019/0306184 | A1 | 10/2019 | Oliner et al. |
| 2019/0317739 | A1 | 10/2019 | Turek et al. |
| 2020/0065857 | A1 | 2/2020 | Lagi et al. |
| 2020/0074295 | A1 | 3/2020 | O'Donncha et al. |

FOREIGN PATENT DOCUMENTS

| | | |
|---|---|---|
| KR | 102148372 B1 | 8/2020 |
| WO | 2021021328 A2 | 2/2021 |

OTHER PUBLICATIONS

Tch, Andrew, "The mostly complete chart of Neural Networks, explained," retrieved from https://towardsdatascience.com/the-mostly-complete-chart-of-neural-networks-explained-3fb6f2367464 on Jul. 27, 2020, published on Aug. 4, 2017 (29 pages). (Year: 2017).*

Foote, Kevin, "A Brief History of Machine Learning—DATAVERSITY," retrieved on Sep. 13, 2021, from https://www.dataversity.net/a-brief-history-of-machine-learning, published on Mar. 26, 2019 (7 pages). (Year: 2019).*

Runge et al., "Detecting Causal Associations in Large Nonlinear Time Series Datasets", Cornell University Library, Available online at: https://arxiv.org/abs/1702.07007, Feb. 22, 2017, 46 pages.

Tiunov; Pavel, "Time Series Anomaly Detection Algorithms", Stats and Bots, Available online at: https://blog.statsbot.co/time-series-anomaly-detection-algorithms-1cef5519aef2, Jun. 8, 2017, 8 pages.

International Application No. PCT/US2019/053576, International Search Report and Written Opinion dated Dec. 12, 2019, 12 pages.

"Episodic Memory", Wikipedia, Available Online at: https://en.wikipedia.org/wiki/Episodic_memory, last modified Mar. 24, 2018, 9 pages.

"Win-Loss Analytics", Wikipedia, , Available Online at: https://web.archive.org/web/20161228213605/https://en.wikipedia.org/wiki/Win%E2%80%93loss_analytics, Last modified Jan. 22, 2016, 1 page.

Runge et al., "Detecting and Quantifying Causal Associations in Large Nonlinear Time Series Datasets", Science Advances, vol. 5, Nov. 27, 2019, 15 pages.

Ramamurthy, et al., *Identifying Employees for Re-Skilling Using an Analytics-Based Approach*, Institute of Electrical and Electronics Engineers International Conference on Data Mining Workshop, pp. 345-354, Nov. 2015.

Singh, et al., *Propensity Modeling for Employee Re-Skilling*, Institute of Eectrical and Eectronics Engineers Global Conference on Signal and Information Processing, 5 pages, Nov. 2017.

U.S. Appl. No. 16/140,153 received a Non-Final Office Action dated Sep. 9, 2021, 12 pages.

(56) References Cited

OTHER PUBLICATIONS

U.S. Appl. No. 16/145,963 received a Non-Final Office Action dated Oct. 29, 2021, 34 pages.
U.S. Appl. No. 16/147,234 received a Notice of Allowance dated Sep. 30, 2021, 13 pages.
U.S. Appl. No. 16/580,746 received a Final Office Action dated Aug. 11, 2021, 89 pages.

* cited by examiner

≡ vision     Search 🔍

Home | Alerts & Notifications | CEO Overview | Sales | Finance | HR | Marketing ⊕

Find content or visualize data

CHRO Overview — 255

Key Insights
1. New Hire attrition at 12%
2. Time since last role changes, time since last compensation change, and Stock Option — top 3 reasons for attrition overall.
3. USA-based manufacturing attrition at 15%. main reasons – "Time since last compensation change' and 'frequency of manager changes'
4. Veronica, Madhav are high risk strategic employees
5. Low team engagement

Leading Indicators this quarter — 260

Drivers that decrease Attrition | Drivers that increase Attrition
- Comp Ratio = 110% | + Tenure: 0-1 yr
- Internal Referral | + <2 yrs in role
- <2 yrs in role | + Low stock option
- Performance >4 | + Performance <3
- > 80% Goals | +
 | +
 | +
 | +
 | +

Groups with highest risk this quarter — 265

| Region | Function | Risk Score | TTM |
|--------|----------|-----------|-----|
| USA | Manufact. | 14% | 45 |
| EMEA | Distrib. | 13.3% | 27 |
| USA | Sales | 12.8% | 25 |
| APAC | Manufact. | 0.0% | 25 |
| USA | Engineering | 7.0% | 52 |

Whom are we losing to this quarter — 270

GAIN FROM LOST TO
SMALL [1-50]
MEDIUM [51-100]
LARGE [500-1000] (-83)
ENTERPRISE (-23)

Attrition this month
9% △ Average across Territories — 275

Attrition by Department this quarter — 280

*FIG. 2B*

≡ ORACLE cxo Cockpits

Home | Alerts & Notifications | CEO Overview | Sales | Finance | HR | Marketing ⊕

Search by KPI Name or Operational Goal

CEO Overview — 505

Quarterly Revenue by Product
$218.6M ▽

YTD Revenue by Territory
$372M
Total Revenue

Lifetime Value to Customer
Accusation cost
$1925M
Per Customer

Attrition by Month
-18
Net Changes

Headcount (US) by State
1327
Total Employees

Net Promoter Score by Product
51 ▲

Operating Expense this Quarter
$149M

Supplier On-time this Quarter
86%
(Dotted line -- inequity Average)

Trending KPIs
Sale Price
Profit
Headcount
COGS by segment
COGS
Employee Diversity
Hire Rate
Units Sold Add a KPI

510

515

520

Filter by Exceptions | None | Minor | Moderate | Severe

TECHNIQUES FOR DATA-DRIVEN CORRELATION OF METRICS

CROSS-REFERENCES TO RELATED APPLICATIONS

The present application claims the benefit of and priority to Provisional Patent Application No. 62/855,218, filed May 31, 2019, entitled, "TECHNIQUES FOR DATA-DRIVEN CORRELATION OF METRICS," and Provisional Patent Application No. 62/737,518, filed Sep. 27, 2018, entitled, "TECHNIQUES FOR DATA-DRIVEN CORRELATION OF METRICS," the entire contents of each of which are each hereby incorporated herein by reference in their entirety for all purposes.

BACKGROUND

A metric (also referred to herein as a key performance indicator ("KPI")) can provide valuable information about the operational performance of a company. Identifying which metrics are most valuable to the user for their decision making can be challenging. Relevant information for the user may be changing rapidly or stagnant. However, the user who regularly looks only at specific metrics may not be aware of the changes that are significant or contain valuable information, particularly if the user is regularly looking only at stagnant metrics.

BRIEF SUMMARY

The techniques described herein provide practically and statistically useful information to the user by providing metrics to the user that are informational, relevant, and personalized for that particular user. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for identifying and displaying high informational content to a user, including that, for each metric indicator of a plurality of metric indicators of an enterprise, a model of the metric indicator is generated having each attribute of a plurality of attributes of the metric indicator as independent variables of the model. For each metric indicator, select, based on the model, at least one attribute of the plurality of attributes having a greatest entropy change contribution. A deck of metric indicators is generated based on selecting a subset of the plurality of metric indicators, where the subset of the plurality of metric indicators are selected based at least in part on having a metric with the largest statistically significant change. A graphical display of each of the subset of the plurality of metric indicators is generated, where each graphical display of the subset of metric indicators includes the at least one attributes of the plurality of attributes. The graphical display is provided to a device of the user for display to the user. Other embodiments of this aspect include corresponding computer systems, apparatus, and computer programs recorded on one or more computer storage devices, each configured to perform the actions of the methods.

Implementations may include one or more of the following features. Optionally, selecting a subset of the plurality of metric indicators includes obtaining a previous time series model-based forecast of a current metric indicator, determining a current value of the metric indicator, and selecting the metric indicator when the previous forecast (the expectation) is significantly statistically different than the current value. Optionally, an explanation of the metrics with the greatest entropy change for the subset of the plurality of metric indicators is generated by applying a current value of the metric indicator to the model along with the value of other independent metrics or variables, to generate a partial derivative (rate of change) of each of the attributes (independent variables) in the model, and selecting a subset of each of the attributes based on an ordered list of the size of the generated derivatives which are statistically significant, and how large of a contribution it makes to the change in the metric, using computational techniques including but not limited to local interpretable model explanations and Shapley Additive Explanations. Optionally, the method may include recording actions of the user within the user interface and generating user preference information of at least one metric indicator, frequency of usage, and the metrics viewed before and after each metric, based on the recorded actions. Optionally, the deck of metric indicators includes the at least one metric indicator in the deck. Optionally, generating a graphical display of each of the subset of the metric indicators includes creating a metric card including at least one visual depiction of the at least one attribute. Optionally, usage behavior of a plurality of users using the user interface is tracked and used for providing suggestions for metrics of interest based on what other users like the current user have viewed in the past. Optionally, trend data about each of the plurality of metrics based on the usage behavior of the plurality of users is generated. Optionally, a graphical trend card including a visual depiction of the trend data is generated. Optionally the graphical trend card is provided in the form of suggestions and recommendations of metrics of interest to one or more users of the plurality of users in the user interface. Implementations of the described techniques may include hardware, a method or process, or computer software on a computer-accessible medium.

BRIEF DESCRIPTION OF THE DRAWINGS

FIG. 2B illustrates an example user interface of a drilled down view of a KPI card, according to some embodiments.

FIG. 5 illustrates another example user interface having KPI cards of interest, according to some embodiments.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are methods and systems for providing suggestions of metric indicators (also referred to as key performance indicators ("KPIs")) to view in a user interface. Also described are techniques for providing high information content to the user, without the user needing to request specific KPIs. The user interface can provide a dashboard (also called a cockpit) that can include a visual depiction of metric indicators (e.g., business metric indicators or key performance indicators). The user interface can be provided by a computer system, such as computer system 1200 of FIG. 12, cloud infrastructure system 1102 of FIG. 11, or server 1012 of FIG. 10. The user interface can be provided and useful to users for viewing metric indicators or the data underlying the metric indicators. Metric indicators may be an aggregation of data or a snapshot view of the underlying data or a time series trend created from the data with statistical transformations including but not limited to mean, median, standard deviation, quartiles, and the like. For example, the metric indicator may provide trend data (e.g., sales have increased 10% in the past 60 days), snapshot information (e.g., year-to-date revenue is $10 Million), and the like. Metrics for businesses can include values for headcount, revenue, attrition, inventory, and so forth. Metric indicators (e.g., key performance indicators) can be generated based on the metrics. For example, a year-to-date revenue metric indicator can provide information on the revenue for the year to date. The metric indicator can provide trending information or historical information that helps a user to understand the metric with some context. For example, revenue values for a single day may not be as helpful to a user as quarterly revenue values.

Figure 2A:
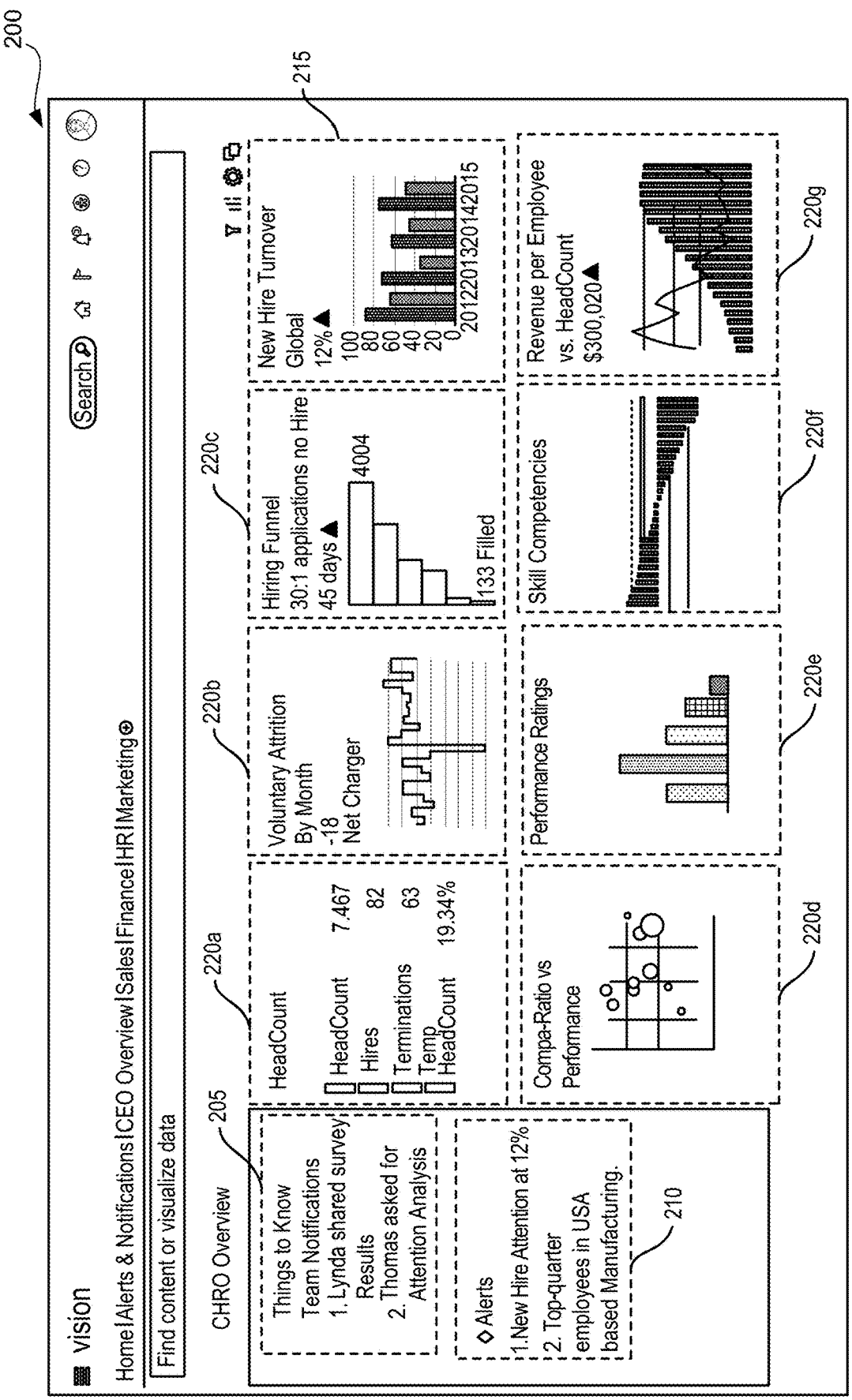
FIG. 2A illustrates an example user interface having KPI cards of interest, according to some embodiments.

As used herein, a metric, metric indicator, variable, metric card, KPI, and KPI card are used interchangeably to describe the data provided about the metric in the user interface and/or the data associated with the metric. For example, KPI card 220a is a KPI card depicting information about the headcount metric. A collection of KPI cards are referred to as a deck. For example, KPI cards 220a, 220b, 220c, 220d, 220e, 220f, 220g, and 215 are a deck of KPI cards displayed to the user as shown in FIG. 2A. In some embodiments, the KPI cards within a deck are related. In some embodiments, the user may select KPI cards for display in the deck that may or may not be related in that there may or may not be metadata within the KPI cards associating them to each other.

The user interface described can include a user interface used by, for example, executives and their teams. Executives may include a chief financial officer (CFO), chief technical officer (CTO), chief human resources officer (CHRO), chief executive officer (CEO), department line managers, business analysts, and so forth. As described herein, the user interface can be called a dashboard. Optionally, the user interface can be used by any user.

When a business initially begins using the described user interface, which can be provided as a cloud application, a site installation, or any other suitable implementation, the user interface for any given user can be generated based on the type of user, the domain of interest the user role, and the responsibilities of the user. For example, CHRO may have a different view (e.g., different metric indicators shown) than a CEO. The CHRO may be more interested in employee data such as headcount, attrition, diversity, and so forth. However, the CEO may be more interested in revenues, inventory, production, and so forth. Accordingly, an out-of-the-box implementation can provide the metric indicators that are more likely to be useful to the user based on the user's title or role within the business. Optionally, when installing the application, the user may select an initial dashboard configuration from several out-of-the-box default configurations including one for a CEO, CHRO, CFO, CTO, and so forth.

Upon use of the user interface by each user, the computer system may track and identify patterns of use for each user. The patterns can include initial viewing habits, sequential viewing habits, habits that can be identified as changing based on data values, and so forth. For example, the CHRO can develop a pattern of opening the user interface, viewing the headcount metric indicator and, if the headcount metric indicator indicates that headcount is high, viewing the hiring metric indicator. However, the CHRO may view the attrition metric indicator if the headcount metric indicator is low, viewing the attrition metric. These viewing habits and their order may be analyzed and stored. The details of the storage of this episodic memory is described in more detail with respect to FIG. 13.

Once patterns of behavior are identified for the user, the computer system may additionally use the current data values or trends to identify information that may be useful to the user based on their usage patterns. For example, the CHRO may be provided with a suggestion at login to view the attrition metric because the headcount metric is low. Optionally, the suggestion can include a notification with the suggestion. For example, the suggestion can appear as a popup in the user interface that includes a suggestion and notice such as "Headcount has decreased since last month and is at a monthly low point. Would you like to view the attrition metric?" The suggestion and notice language can be clickable such that the user can click the text to view the attrition metric within the user interface. In some embodiments, the relevant data is provided to the user without requesting the user's preference, simply because it is statistically significant or because it is relevant for the specific domain.

Additionally, the usage behavior of all users, input information from users, and the behavior of the metric indicators over time may be used to identify relationships between the metric indicators. For example, the CHRO behavior of viewing the attrition metric indicator shortly after the headcount metric indicator (within a threshold period of time)

may cause the computer system to identify a relationship between the attrition metric indicator and the headcount metric indicator. Similarly, the CHRO behavior of viewing the hiring metric indicator shortly after the headcount metric indicator (within the threshold period of time) may also cause the computer system to identify a relationship between the hiring metric indicator and the headcount metric indicator and place a weight on that edge in a graph of relationships where the relationships' strength is defined by the weights on the edges and the nodes are the metrics. The metric indicators may have associated metadata that the computer system may use to create the relationship between two metric indicators. Optionally, a metric indicator may have any number of relationships. In the example above, the headcount metric indicator has two related metric indicators and the attrition metric indicator and hiring metric indicators each have one. Optionally, the computer system may identify the relationship by analyzing the user logs to find indicators that are viewed closely in time based on timestamps in the user log. In some embodiments, the user logs for multiple users may be used to generate relationships between metric indicators that are used for all other users.

The metric indicator behavior over time may also be used to identify relationships between metric indicators. For example, over time the computer system may analyze the values (trends) of the metric indicators. The computer system analysis methods may identify leading and lagging indicators, for example. One example may be that when inventory begins trending downward, revenue also trends downward, but sometime later (e.g., 3 days later, 2 weeks later, 1 month later, or the like). The computer system may analyze the similarity of trends with a time delay for the revenue trend and identify the inventory metric indicator as a leading indicator for the revenue metric indicator and, conversely, identify the revenue metric indicator as a lagging indicator for the inventory metric indicator. The metadata associated with each metric indicator can be used to store the relationship as well as the type of relationship (leading indicator/lagging indicator) between the two metric indicators.

In some embodiments, the users may enter through the user interface relationships between metric indicators. Metric indicators may be created by users, so entry of relationships within the metric indicator information may be helpful to other users to have relationships created.

The relationships created using user logs, explicit user entry of the relationship via the user interface, and/or the metric indicator behavior may be used by the computer system to generate recommendations to users based on the user's role (e.g., a human resources team member, a finance team member, and so forth), the user's behaviors, and/or the user's current view as shown in more detail below.

An embodiment includes techniques for crowd sourcing metric indicators. In some embodiments, when the system is initially set up for a business, which may be as a site installation or as a cloud-based system provided as a software as a service ("SaaS") implementation, the out-of-the-box dashboard for any given user can include a set of metric indicators that are relevant for that type of user. For example, the CEO may have different metric indicators on the dashboard than, for example, the CHRO. One of the metric indicators can be a trending metric indicator. The trending metric indicator can provide using, for example, a tag cloud, the trending metric indicators. For example, the trending metric indicators can include the metric indicators being viewed by other users in the company or, in some embodiments, more specifically by others on the user's team. In some embodiments, when the installation is new, the trending metric indicators may be identified based on what other users in other companies are viewing within their companies as common domain knowledge. The tag cloud can provide a list of metric indicator names that have varying font sizes based on the popularity of the metric indicator. For example, a metric indicator being viewed heavily can have a larger font than a metric indicator being viewed by only a single user. In some embodiments, regardless of how long the business has used the system, the trending metric indicators may be configured by the user to identify the tag cloud based on the user's team, the company generally, or other similar companies hosted in the same cloud-based system. The tag cloud can be generated based on tracking user behaviors and which metric indicators are being viewed at any given time. The trending metric indicator can be updated periodically, for example, every 1 hour or upon refresh by the user. The metric indicators listed in the trending metric indicator can be selected by the user. Upon selection, the metric indicator can be added, for example, to the user's dashboard. In some embodiments, selection of the metric indicator name from the tag cloud can provide a detailed screen providing information related to the selected metric indicator.

In some embodiments, metric indicators include metadata used to model business metrics. Each metric indicator can have a number of attributes. Each metric indicator definition can describe a primary value along with a detail perspective that provides additional information on the primary value.

In some embodiments, metric indicators can be shared across business domains (e.g., customer experience ("CX"), human capital management ("HCM"), enterprise resource planning ("ERP"), supply chain management ("SCM")). Each metric indicator can be informed by persona needs and business goals within those specific domains. The user interface can provide immediate value and can morph over time to best serve the business. Metric indicators, therefore, can reflect prior-knowledge of the business as well as "learn" over time. The user interface can morph (change) because, for example, new metric indicators can be used in the user interface for a user as a default and different attributes for each metric indicator might be shown. Further, suggestions can be provided that can allow the user to modify the dashboard/user interface details.

Upon initial installation (e.g., a site installation or a cloud-based implementation), more than one metric indicator can be defined and provided as part of the application. After installation, metric indicators can continue to be organizationally-defined and picked up (selected for use) by users. Metric indicators can also arise organically over time to surface new or changing business needs. Metric indicators can reflect prior knowledge of the business and can "learn" to be chosen over time as recommendations from usage histories of users. Metric indicators can leverage data to model the business. The data can be provided by industry benchmark data, third-party data sources, sales and production data sources, and so forth.

Figure 1:
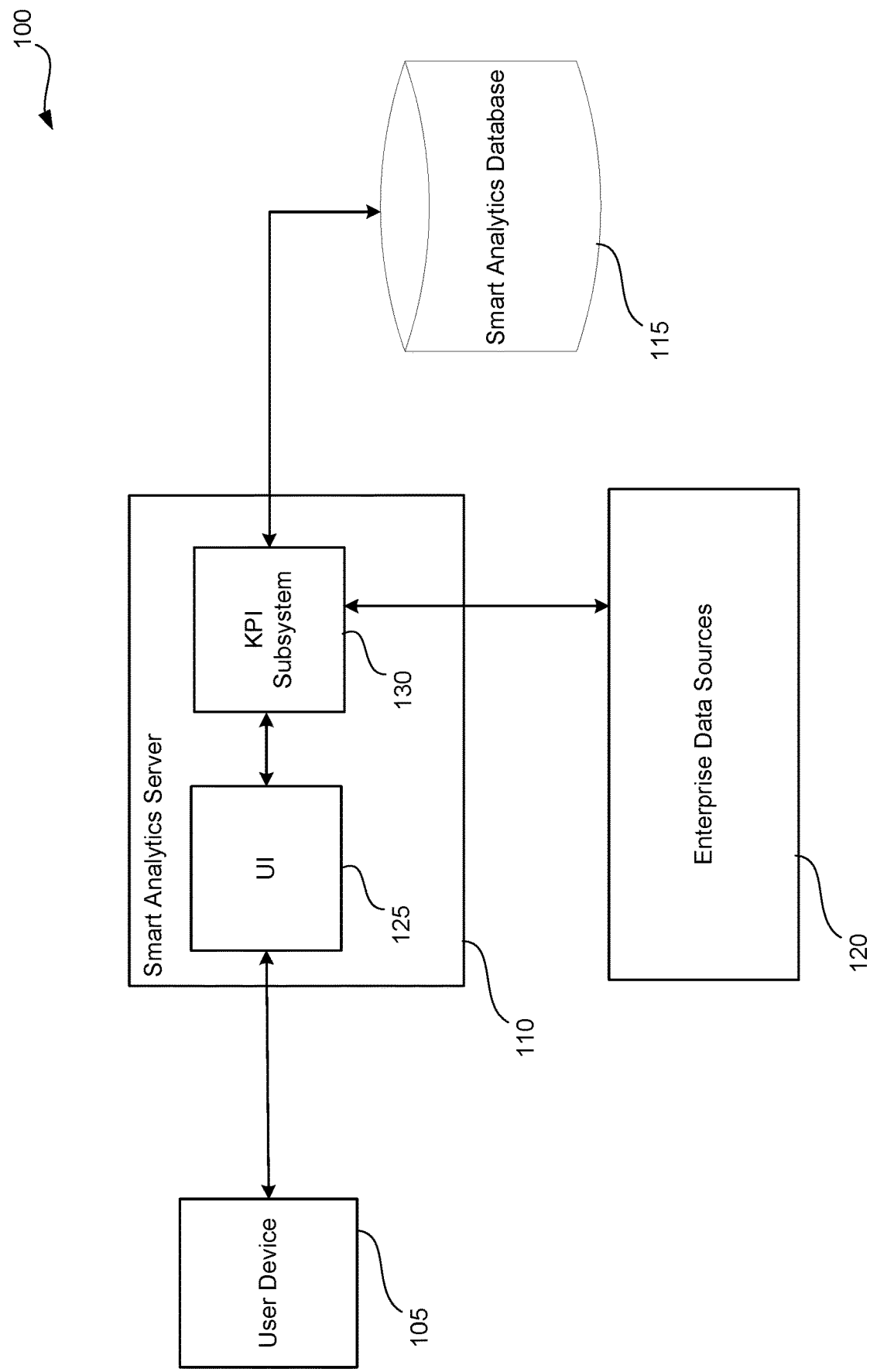
FIG. 1 illustrates a high-level overview of the smart analytics system, according to some embodiments.

Turning now to FIG. 1, the smart analytics system 100 is shown in a high level block diagram. The smart analytics system 100 can be used to generate the metric indicators (KPIs and cards) to show to the user. Smart analytics system 100 includes a user device 105, a smart analytics server 110, a smart analytics database 115, and enterprise data sources 120. Smart analytics system 100 may include additional components not shown for simplicity in FIG. 1.

Figure 10:
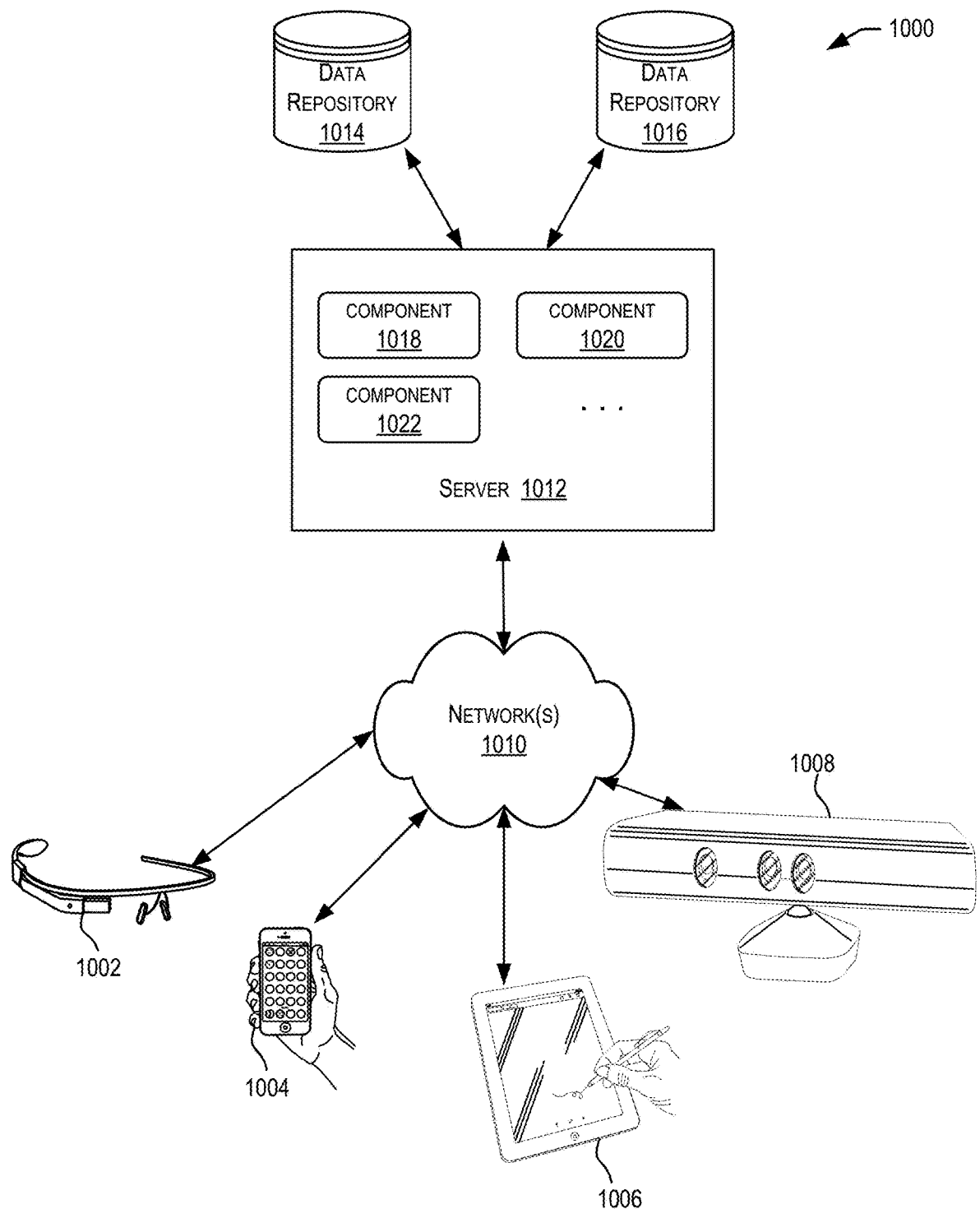
FIG. 10 illustrates an example network computer system, according to some embodiments.
Figure 11:
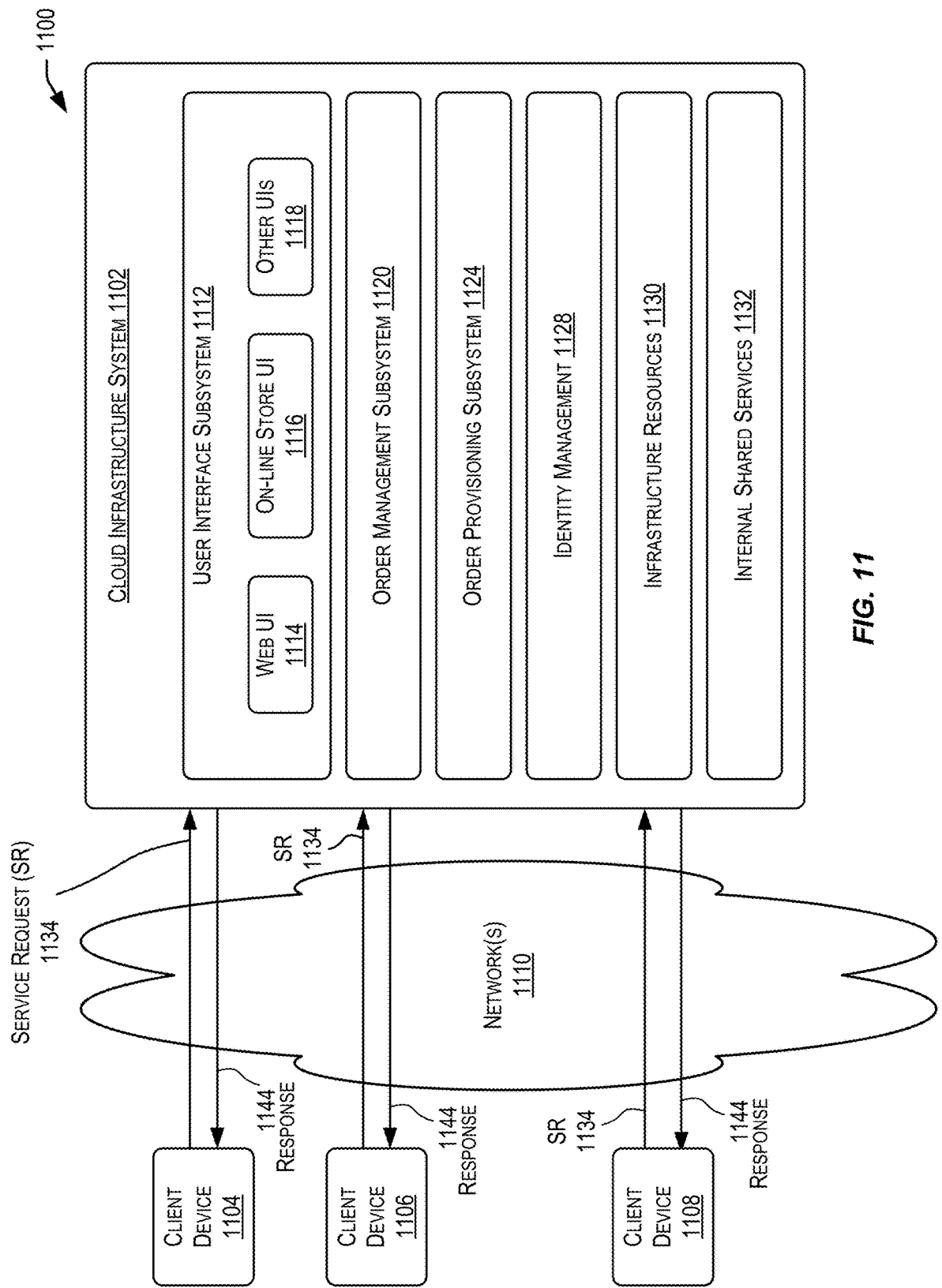
FIG. 11 illustrates an example cloud-based computer system, according to some embodiments.
Figure 12:
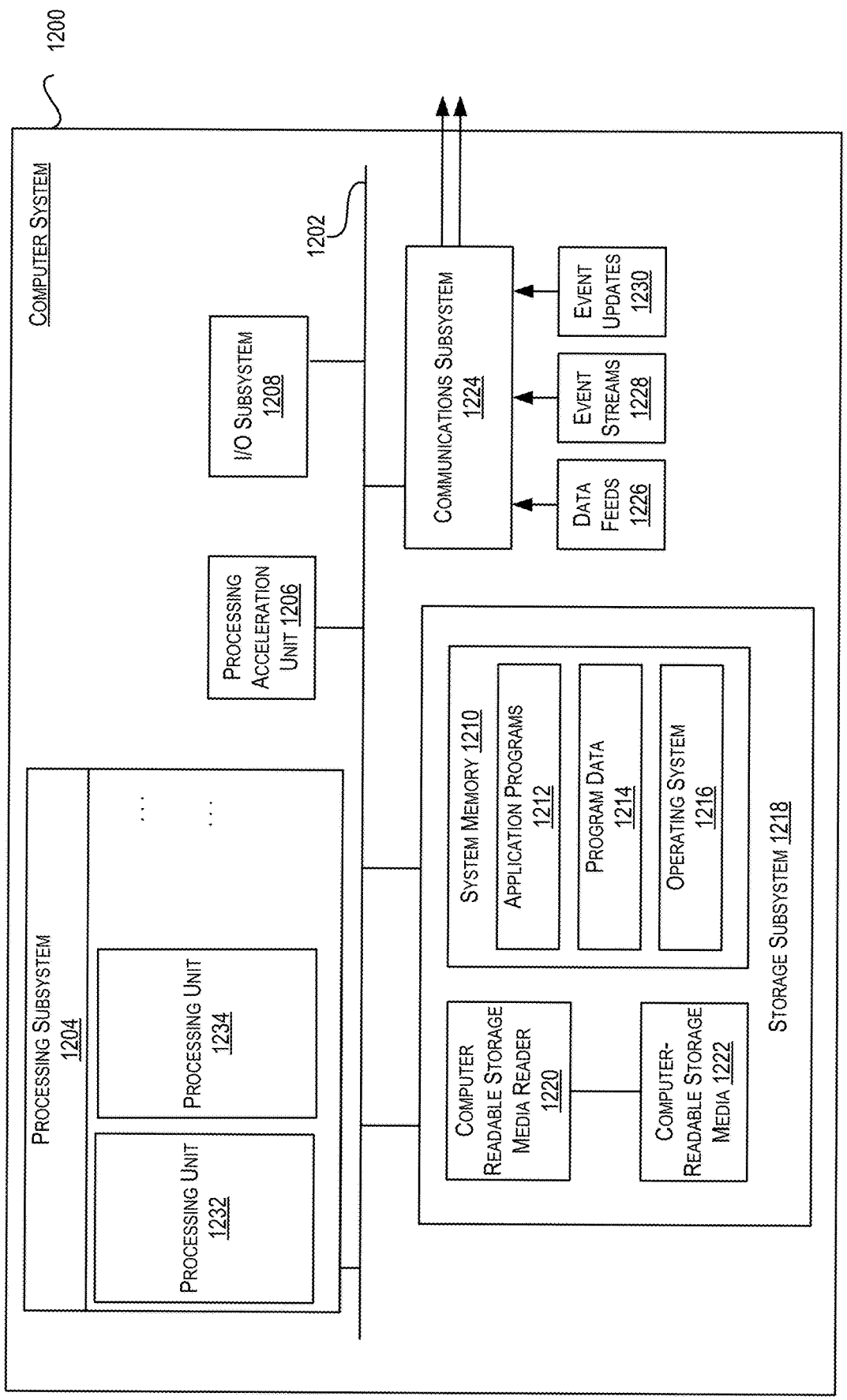
FIG. 12 illustrates an example computer system, according to some embodiments.

The user device 105 may be any suitable user computing device such as user device 1002, 1004, 1006, or 1008 of FIG. 10, client device 1104, 1106, 1108 of FIG. 11, or computer system 1200 of FIG. 12. The user may use the user device 105 to access the user interface 125 of smart analytics server 110 to obtain a graphical user interface showing KPI cards and decks.

Smart analytics server 110 may be a computer system, such as computer system 1200 of FIG. 12, or server 1012 of FIG. 10. Smart analytics server 110 includes user interface 125 and KPI subsystem 130. User interface 125 can be used by user device 105 to obtain access to the information generated by KPI subsystem 130. KPI subsystem 130 generates metric indicators (KPIs), recommendations for metric indicators, and otherwise identifies the high value content for users to view as described in more detail in FIG. 13. KPI subsystem 130 access the smart analytics database 115 to store and obtain information generated by smart analytics server 110. Smart analytics database may include metadata index 1330, important KPIs and relationships database 1332, Roles and KPIs database 1334, and action knowledge base 1336 of FIG. 13.

Enterprise data sources 120 may be any data sources of the enterprise that provide data used for creation of KPIs. This information may be retrieved from enterprise data sources 120 by smart analytics server 110 to perform metric indicator analysis as described in more detail below.

FIG. 2A illustrates an example dashboard 200 for a CHRO. The user can log into the dashboard/user interface, which can be hosted on a computer system such as, for example, computer system 1200 of FIG. 12, cloud infrastructure system 1102 of FIG. 11, or server 1012 of FIG. 10. The dashboard 200 can include multiple metric indicator cards 215 and 220. The cards 215 and 220 may each provide a view of the activity represented by the metric indicator. The metric indicator cards 215 and 220 may each be a card that represents information for a specific metric. The information may be stored in a data store of information for the company. Each user may group various metric he metric indicator cards into one or more decks. In some embodiments, the decks are created by the system or are grouped based on metadata underlying each of the metric indicator cards 215 and 220. Each metric indicator card may include metadata that includes information (e.g., an identifier) about other, related metric indicator cards. The metric indicator cards 215 and 220 may each be created by users of the system, may be created by the system based on user behaviors, or may be provided with an initial implementation of the system.

The metric indicator cards 215 and 220 can be generated by a user by selecting the metric to view along with metadata. These cards may be personalized by each user while still relying on the same underlying data. For example, the metric indicator cards 215 and 220 may show a line graph trend for one user while another user prefers a pie chart display. These types of user specific personalizations are stored in the metadata for that user in the metric indicator card. Additional information in the metadata of the metric indicator cards 215 and 220 include relationship data for related metric indicators. The relationship data may be generated manually, by rules, and/or using machine learning.

The dashboard 200 can include a section that provides notices 205. The notices 205 can include team notifications that are applicable to all users within the team. Information for specific users (e.g., Lynda and Thomas) can be provided that are useful for all members of the team. The alerts 210 can provide the suggestions and notifications to the user that are relevant. For example, the alert box 210 includes an alert that new hire attrition is at 12%. The new hire turnover metric indicator 215 shows further data to the user regarding this alert. The second alert 210 also states that top-quartile employees in USA-based manufacturing attrition is 4.8 times higher than the expected rate, which is information that may be valuable to the user in the CHRO user interface. The alert can be clickable such that selection of the alert can provide a view of a metric indicator that provides relevant data for that attrition information.

If the alert is selected, the user interface 250 of FIG. 2B can be provided to the user. The user interface 250 can include information relevant to the alert. For example, user interface 250 can include further insights 255 into the data relevant to the high attrition rates. Leading indicators 260 can provide further insight to the user as to the high levels of attrition and the employees leaving. A high risk metric indicator 265 can identify those portions of the company that are at risk for additional attrition based on the historical data. The losing metric indicator 270 can provide information on the employees that have left in the last quarter. The attrition metric indicator 275 can provide monthly attrition information based on region (e.g., Europe and Africa). The attrition by department metric indicator 280 can provide quarterly information on attrition organized by department.

The dashboard 250 may be one view of a drill-down of metric indicators based on a selected metric indicator from the initial dashboard 200. In some embodiments, different metric indicators may be configured to be displayed based on the selected metric indicator.

Figure 3:
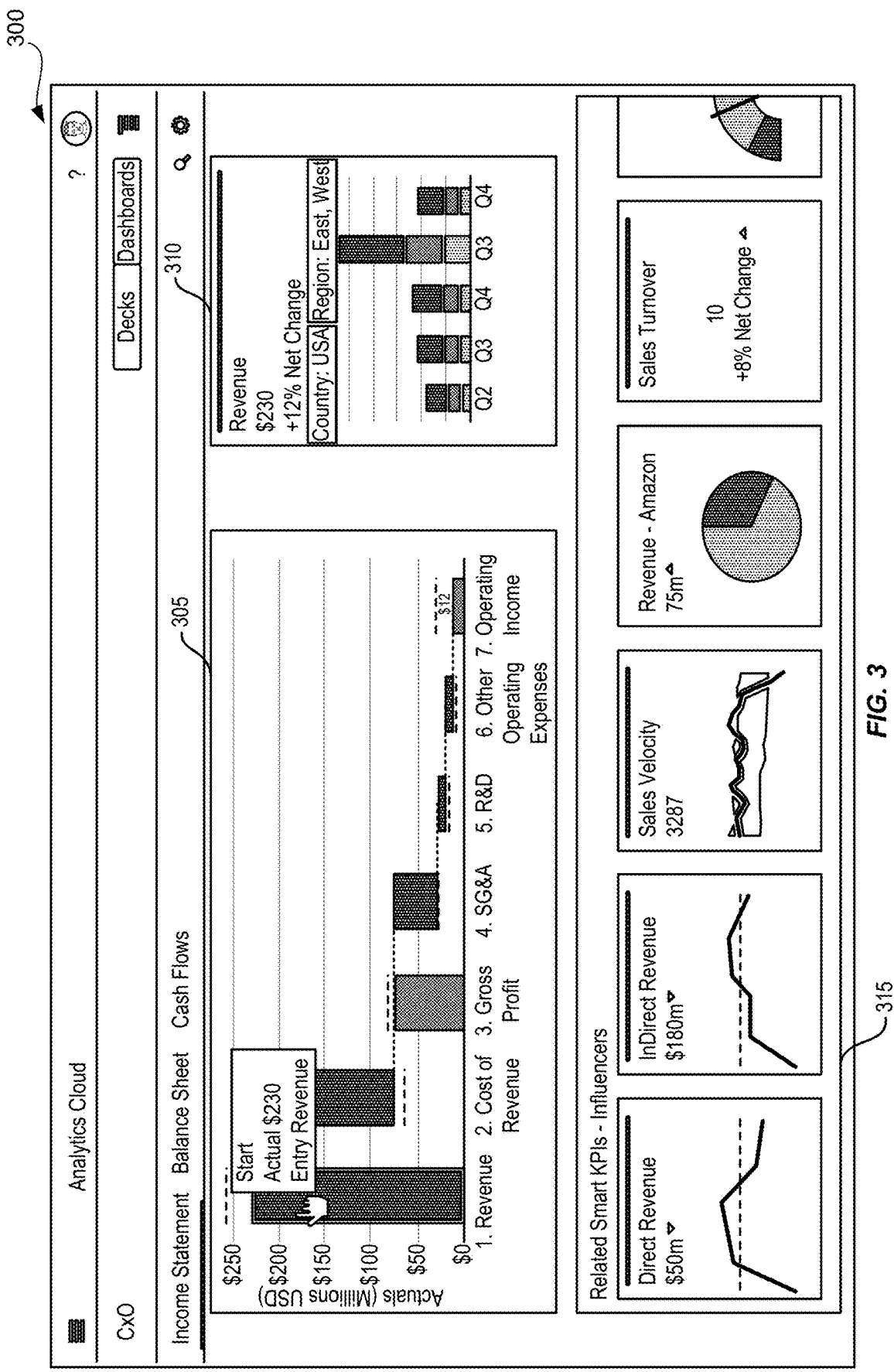
FIG. 3 illustrates an example user interface with related metric suggestions, according to some embodiments.

FIG. 3 may by another example dashboard 300. A finance team member, for example, may be viewing the income statement metric indicators including the income statement graph 305. The user may select the Revenue bar in the income statement graph 305, which may display the revenue metric indicator 310. Because of relationships identified between the revenue metric indicator 310 and the direct revenue metric indicator, indirect revenue metric indicator, sales velocity metric indicator, revenue—Amazon metric indicator, sales turnover metric indicator, and so forth, the metric indicators in the related smart indicators selection box 315 may be displayed for the user to select and view.

In some embodiments, the metric indicators shown in the related smart indicators selection box 315 may be selected based on relationships created based on one or more user's usage behavior (e.g., analysis of the user logs of the user), explicit relationship creation by a user via the user interface, and/or by automatic relationship creation based on the computer system analyzing the metric indicator behavior over time. In some embodiments, the viewing user's behavior may be used to select the metric indicators shown in the related smart indicators selection box 315. For example, if the user recently viewed a metric indicator, it may be excluded (or included) in the related smart indicators selection box 315.

Figure 4:
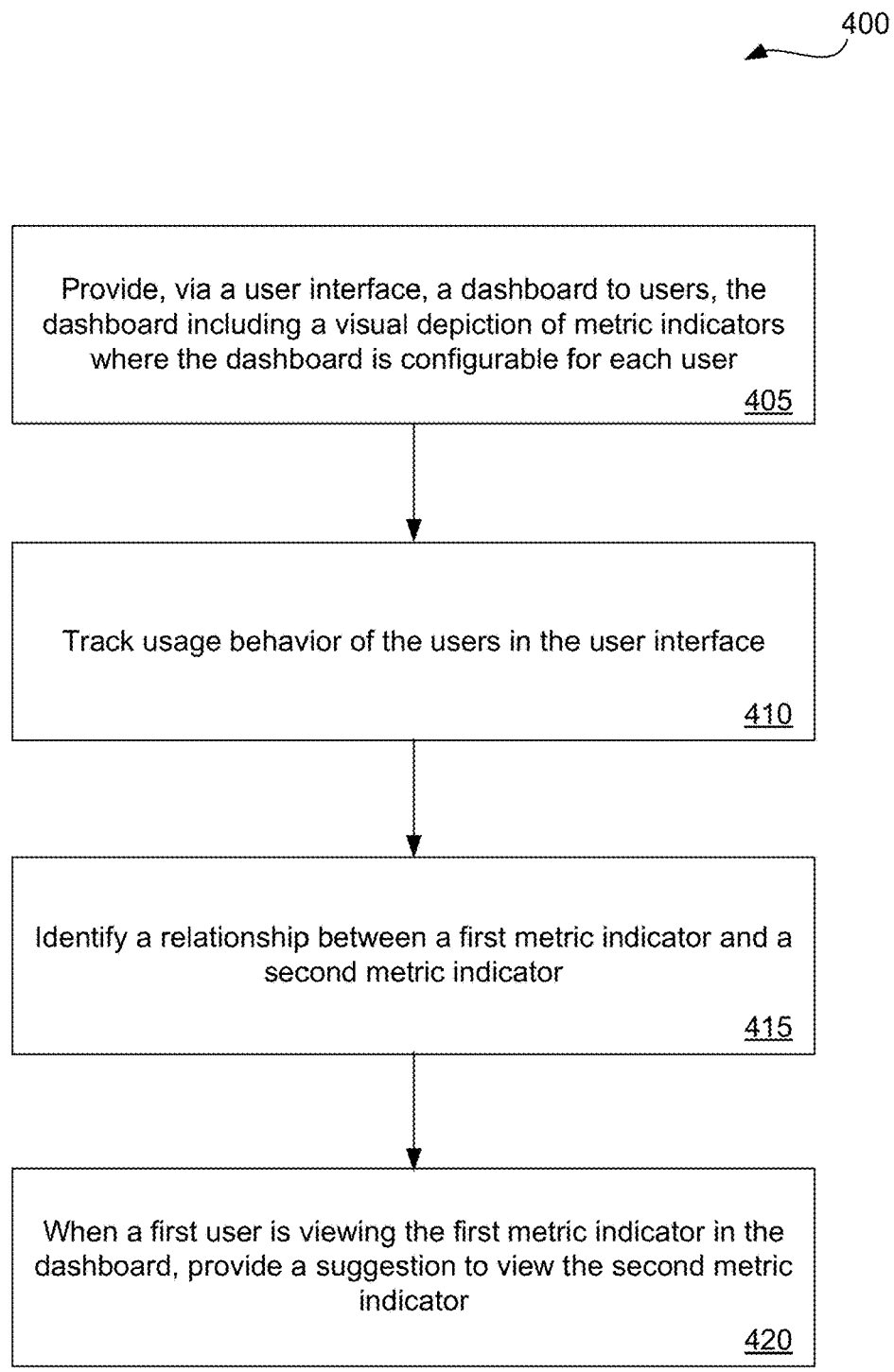
FIG. 4 illustrates a method for identifying related metrics, according to some embodiments.

FIG. 4 can be a flowchart 400 for a method for providing data-driven correlation of metrics. The method of flowchart 400 can be performed by a computer such as, for example, server 1012 of FIG. 10, cloud infrastructure system 1102 of FIG. 11, or computer system 1200 of FIG. 12. The flowchart 400 can begin at step 405 with providing, via a user interface, a dashboard to users, the dashboard including a visual depiction of metric indicators where the dashboard is configurable for each user. For example, user interfaces 200 or 250 provide metric indicators for a human resources ("HR") user. A different type of user may want to see financial information (e.g., revenue metric indicators) and can configure the dashboard accordingly. In some embodiments, initial dashboard configurations can be provided to various types of users. For example, an HR user may select the HR dashboard configured with headcount metric indicators, hiring metric indicators, attrition metric indicators, and the like. As another example, a finance user may select the finance dashboard configured with revenue metric indicators, sales metric indicators, and the like. Each user may then be able to remove and add metric indicators to make the dashboard unique to that user. The method can continue at step 410 with tracking usage behavior of the users in the user interface. For example, the HR user can typically look at a metric indicator for attrition rates in the US for the last quarter when the user logs in. This can be identified as a usage pattern. Each of the user activities may be stored in a user log. The user log may contain, for example, the user name, the activity, and a timestamp. The method can continue at step 415 with identifying a relationship between a first metric indicator and a second metric indicator. For example, the user log information may indicate that users view the first metric indicator and the second metric indicator within a threshold time period of each other. The method may continue at step 420 with, when a first user is viewing the first metric indicator in the dashboard, providing a suggestion to view the second metric indicator. For example, user interface 300 provides an example view with suggestions. The related smart metric indicator selection box 315 provides the suggestions of related metric indicators based on the user viewing the revenue metric indicator 310.

Returning to step 415, identifying the relationship between the first metric indicator and the second metric indicator may include identifying the relationship because a user manually entered the relationship via, for example, the user interface. Users may be able to tag the metric indicators as related and mark them. For example, a user can select two metric indicators and mark the first as leading (i.e., the trend of this metric indicator leads the second metric indicator) and the second as lagging (i.e., the trend of this metric indicator follows the trend of the second metric indicator). The metadata stored with the metric indicators allows for this tagging and relationship creation. The metadata may be stored, for example, in data repository 1014 as described with respect to FIG. 10.

At step 415, identifying the relationship between the first metric indicator and the second metric indicator may include identifying the relationship based on user logs that log user behaviors and activities in the user interface. For example a sample usage log is shown in Table 1.

TABLE 1

| Log date time | Login | Metric Indicator Name |
|---|---|---|
| 2018 Jun. 12 12:34:01 PM | Richard | Gross Profit |
| 2018 Jun. 12 12:36:45 PM | Richard | Revenue by Region |
| 2018 Jun. 12 12:37:23 PM | Richard | Revenue by Employee |
| 2018 Jun. 12 2:16:12 PM | John | Gross Profit |
| 2018 Jun. 12 2:20:01 PM | John | Revenue by Region |
| 2018 Jun. 12 4:39:42 PM | Raja | Revenue by Sales Channel |

Using the log shown in Table 1, and using association rule learning based data mining, the metric indicators that are viewed together frequently are identified, and an association is made between those metric indicators. This analysis may not identify the type of relationship and identify that there is a likelihood of a relationship. For example, using the example log in Table 1, "Gross Profit" and "Revenue by Region" may be identified as having a relationship because multiple users execute them sequentially during sessions. The association rules may identify that the metric indicators were executed in the same session by the same user or within a specific period of time by the same user. The sequence of execution may also offer insight in the association rule algorithm. The association may also include additional information including the type of user (user role and/or area) that the relation applies to. Using the example above, the user's area may be CFO and the user role may be Finance Executive. User logs may be collected for each user in the enterprise.

At step 415, identifying the relationship between the first metric indicator and the second metric indicator may include identifying the relationship automatically by analysis of the metric indicator trends. Metric indicator value trends may be used to identify related metric indicators as well as the type of relationship (e.g., leading/lagging metric indicators). On a periodic basis (e.g., daily, weekly, monthly, quarterly, yearly, and so forth) a snapshot can be created of the values for each metric indicator. The snapshot can be used to identify any trends, patterns, and/or interdependencies. If, for example, a first metric indicator increases and then a second metric indicator also increases, and this trend is shown consistently, a relationship may be inferred between the two metric indicators. The span of time used for identifying whether two metric indicators trend together or one leads/lags another may vary. For example, some metric indicators may trend together and be seen in each snapshot while, in other relationships, a second metric indicator may lag another metric indicator by months. As another example, if a third metric indicator increases and then a fourth metric indicator decreases, a relationship between the metric indicators may be inferred. Table 2 provides example metric indicator data snapshot values.

TABLE 2

| Date | Metric Indicator Name | Value |
|---|---|---|
| 2018 Jun. 12 | Gross Profit | 26,32,853 |
| 2018 Jun. 12 | Revenue | 89,45,389 |
| 2018 Jun. 12 | Cost | 63,12,536 |
| 2018 Jun. 13 | Gross Profit | 24,34,853 |
| 2018 Jun. 13 | Revenue | 89,45,389 |
| 2018 Jun. 13 | Cost | 65,11,536 |

Table 2 provides a snapshot of values collected and stored for three metric indicators (Gross Profit, Revenue, Cost) over a two day period. Such a metric indicator snapshot can be collected across all hosted customers in a cloud-based hosted environment. An algorithm may be applied to the snapshot data to identify trends in metric indicator values. Correlations between the metric indicator values that consistently trend together (e.g., over time both metric indicators increase and/or decrease together or one metric indicator increases followed after some time by the other increasing and/or decreasing) are used to identify that the metric indicators are related as well as the type of relationship (e.g., leading/lagging).

FIG. 5 illustrates another example user interface 500 that can be, for example, an initial out-of-the-box dashboard provided for a user. As the user utilizes the user interface, the tracking discussed above can be used to provide suggestions based on the usage patterns of the user and the current data related to the usage patterns.

User interface 500 may be a dashboard for, for example, a CEO. The CEO user interface 500 can include metric indicators for quarterly revenue 505, year to date ("YTD") revenue 510, and so forth. The CEO user interface 500 can also include the trending metric indicator 515. The trending metric indicator 515 can be a tag cloud that provides the trending metric indicator information (also described as crowd sourced metric indicator information herein). Metric indicators that are more popular are depicted with larger font. In user interface 500, for example, the Employee Diversity KPI is the most popular metric indicator as currently displayed and shown by the largest font. In some embodiments, color coding may further be used to highlight the most popular/currently trending metric indicators. For example, a bright color may be used for those that are trending the most while a dim, grey, or other less noticeable coloring may be used for those metric indicators that are less popular at the time the trending information is gathered. As the user is viewing the user interface 500, the trending metric indicator 515 may change as the metric indicator trends change. For example, as the Profit KPI becomes more popular (heavily used by others in the enterprise, team, or the like), the font size of "Profit" within the trending metric indicator 515 may increase. Similarly, for example, as the Hire Rate KPI becomes less popular (viewed by fewer users in the enterprise, team, or the like), the font size of "Hire Rate" within the trending metric indicator 515 may decrease. In some embodiments, the user may select a metric indicator within the trending metric indicator 515, for example, by clicking on the metric indicator name within the trending metric indicator 515. Selecting the metric indicator name may drill into the metric indicator selected by displaying the metric indicator and/or a more detailed screen having the metric indicator and other underlying information on the metric indicator. In some embodiments, the user may select whether the trending metric indicator 515 analyzes the trends of metric indicators based on all users in the enterprise, users belonging to a specific team within the enterprise, across other enterprises if the information for other enterprises is available, and so forth.

Figure 6:
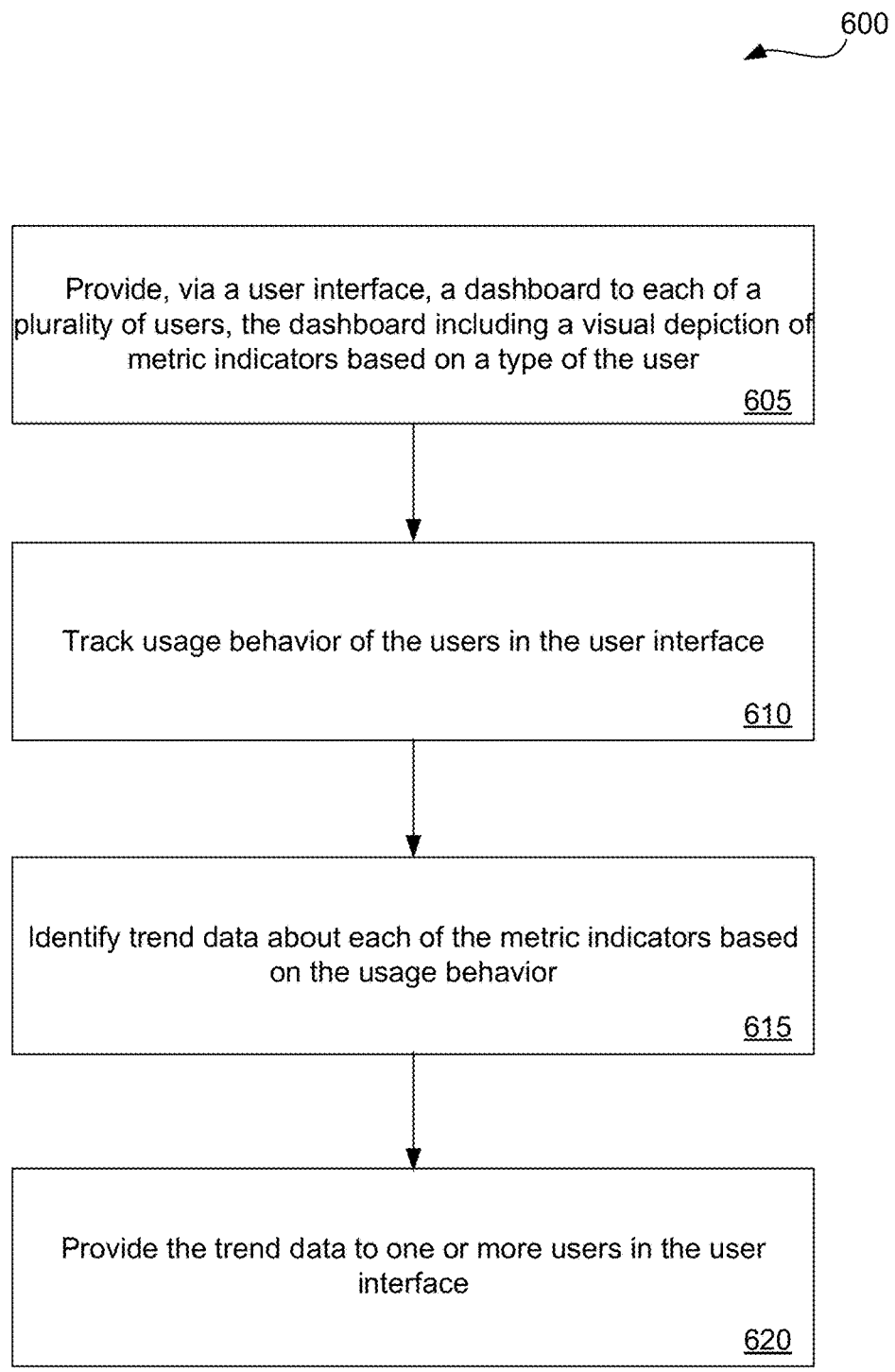
FIG. 6 illustrates another method for identifying related metrics, according to some embodiments.

FIG. 6 illustrates a flowchart 600 describing a method for crowdsourcing metric indicators. The method can be performed by, for example, server 1012 of FIG. 10, cloud infrastructure system 1102 of FIG. 11, or computer system 1200 of FIG. 12. The method can include, at step 605, providing, in a user interface, a plurality of metric indicators. In some embodiments, the metric indicators are all generated by the manufacturer of the software. In some embodiments, the metric indicators may be generated and/or customized by the user. The method can further include, at step 610, tracking multiple users using the user interface. In some embodiments, the users can be teammates of the individual using the user interface. In some embodiments, the users can be other users within the company of the individual using the user interface. In some embodiments, the users can be from other companies (enterprises). The method can further include, at step 615, identifying trend data about each of the metric indicators based on tracking the usage of the users. For example, if a lot of the users (e.g., 15 users in a 40 user enterprise) are viewing one metric indicator, that metric indicator can be considered trending. The determination of whether a metric indicator is trending up or down may include analyzing over a certain period of time (e.g., 30 minutes, 24 months, three quarters, 13 weeks) whether the number of users viewing the metric indicator is increasing or decreasing. Additionally, the number of users that are viewing a first metric indicator may be considered in relation to the number of users that are viewing other metric indicators to determine whether the first metric indicator is popular. Further, the total number of users in the system may further indicate the popularity of a metric indicator based on, for example, a percentage of users that are viewing the metric indicator (e.g., 90% of users viewing the metric indicator may indicate high popularity and large font in the tag cloud while 2% of the users viewing the metric indicator may indicate low popularity and no presence of the metric indicator in the tag cloud of the trending metric indicator 515). A metric indicator receiving little attention and/or views may have a low trending value. A metric indicator that has decreasing views may also have a low trending value. The method can also include, at step 620, providing the trend data to one or more users in the user interface by way of suggestions and recommendations for viewing those KPIs. For example, a tag cloud can be generated which identifies the trending metric indicators such as trending metric indicator 515 of FIG. 5. The tag cloud may also provide a clickable list indicating the metric indicator name and providing information about the trending value or popularity of the named metric indicator. For example, the most popular metric indicators may be displayed in a large font in the clickable list. Optionally, the method can include receiving selection of a metric indicator named in the clickable list and, in response to the selection, providing a view of the details of the selected metric indicator to the user via the user interface.

Returning to FIG. 5, the user interface 500 can include an option to add a metric indicator 520. Selection of the add a metric indicator 520 may provide the user interface depicted in user interface 700 of FIG. 7. The user interface 700 may provide a screen 705 that allows the user to select the type of metric indicator selected.

Figure 8:
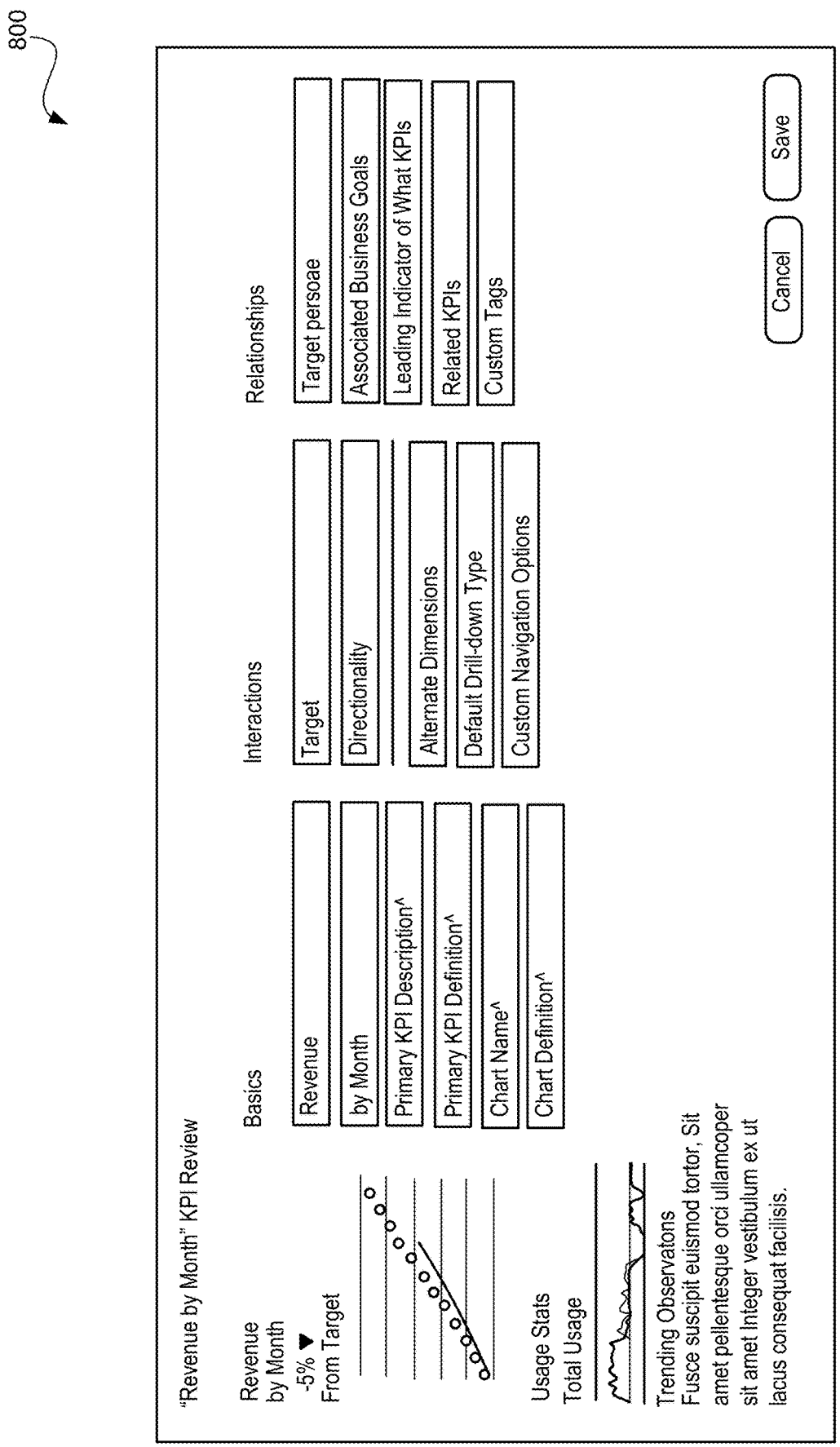
FIG. 8 illustrates an example user interface for providing details of a new KPI, according to some embodiments.

FIG. 8 may illustrate a user interface 800 that can be used to enter data associated with the metric indicator. The basics, interactions, and relationships, when entered by a user, provide metadata to be associated with the metric indicator. For example, the target personae can identify the type of user to target. As another example, related metric indicators can be identified to make cross referencing an option (to create a relationship for recommendation as described with respect to FIGS. 3 and 4). Each of the metadata values can further be used to identify relevant results when a user searches within the user interface.

Within the user interface, "New" metric indicators can be data-driven based on the needs of the consuming persona and can reflect any number of Oracle® and non-Oracle® data sources. New metric indicators can be configurable by the user and can be viewed across multiple touchpoints based on the user's preferences. New metric indicators can be pushed to the user (alerting) based on business urgency derived from configurable thresholds, industry benchmarks, or advanced intelligence ("AI") driven monitoring. The metric indicators can further serve as a focal point for the application. The metric indicators can also be configurable by the user. The metric indicators can be viewed across multiple touchpoints based on the user. The metric indicators may be able to filter not only the metric indicators currently shown on their user interface, but all available metric indicators based on a range of parameters. Search can provide a mechanism for simple and complex searching/filtering. Simple controls for filtering and surfacing sets of metric indicators can be provided.

In some embodiments, search parameters can include, for example, Topical/Business Goals, KPI State & State Severity, Usage/Trending, Seasonality, and so forth. In some embodiments, searching can always be present on the user interface. The searching can integrate with Ask functionality. Further, search may not be present based on derived relationships.

In some embodiments, the system can utilize relationships derived from metadata tags as well as application usage as described with respect to FIGS. 3 and 4.

The application/user interface can be driven by a consistent definition of metric indicators which can be configured to be surfaced as the user desires. One example of configuring the metric indicator can include setting personalized thresholds that override metric indicator defaults. Threshold types can include Personal Threshold(s), Benchmarks, and Automatic/AI detection. The metric indicator can further include custom navigating, Multiple Thresholds, Override Directionality, Custom Navigation to follow-on processes, General Rules, Override Rules, and/or Custom Tags. Based on the thresholds defined in the user interface for metric indicators and a user's preference as to the mechanism of updates, the user interface and/or server system can provide those updates. The user can have the ability to configure the manner in which notifications of different severity are sent—e.g., text to mobile device, email, voice, etc. Where possible, a link back to the original metric indicator and next-step actions can also be provided accompanying the notifications.

Within the user interface, the metric indicator can provide a snapshot into the business and a starting point for a number of subsequent actions. These next-steps are intended to further describe or explore the business as well as take action on a problem or opportunity revealed by the metric indicator. Next-steps span a continuum from tightly-defined, automated drill-downs to completely customizable navigation paths. Ultimately, the metric indicator may effectively serve as a gateway to a wealth of capabilities.

Figure 9:
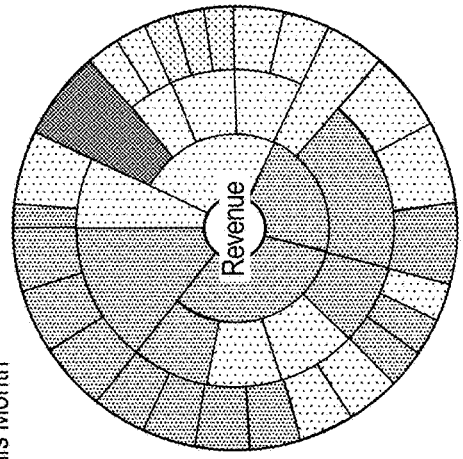
FIG. 9 illustrates an example user interface of a drill down view of the new KPI, according to some embodiments.

In some embodiments, drill-to-detail can be available. FIG. 9 is an example metric indicator detail view 900 for the revenue by month metric indicator. For example, based on the metadata, including derived data, and the metric indicator details, a selection of related indicators can be selected for the drill down menu of the revenue by month metric indicator. The drill-down analysis are automatically generated and mapped to pre-defined patterns. Based on the metric indicator type (e.g., ones focused on time, leading indicators, aggregate information demanding decomposition, and so forth) and the collection of metric indicator attributes, the optimal pattern can be automatically selected. This choice can also be overridden at the metric indicator definition level. Even with a default selection, other drill-down patterns may still be instructive and the user may still be able to see those if they choose.

Multiple attributes of the metric indicator itself as well as observation of how they are being used can be used to drive the automated generation of insightful analytic experiences—also called drill-down screens. The approach removes the burden of manually creating content from the user, and reveals insights otherwise missed. First, the definition of the metric indicator metadata and metric indicator type can directly determine and populate the drill-down detail screens. An example can be to render the range of information permutations captured with the metric indicator in order to present information to the user broken out by dimension or expanded out by prompts. Second, drill-downs can also be tailored based on user preferences (thresholds). Personal thresholds inform relevance for a specific user and can be also aggregated across user populations. Data captured around user behavior and system usage provide a third input. Detail templates for tailored drill-downs may include Factors contributing to, associated with, or explaining a specific metric indicator, Related metric indicators based on usage, Leading/Lagging Indicators, Related Analyses, and Other. Detail views might span or incorporate multiple metric indicators. Fourth, derived insights from Machine Learning algorithms (identifying patterns or anomalous events across large amounts of data) can also be gleaned from system data and usage, attached to a metric indicator, and surfaced in these metric indicator drill-downs. Classic (TIME) Historical & Predictive Analysis also further inform the state of the business. As this is a dynamic system where usage, data, and content is constantly changing, outputs will morph over time based on the state of the application. Related metric indicators, leading/lagging indicators, or predictive analyses are good examples.

Some embodiments can include a method for providing metric indicator authoring approaches for dynamic analysis. The method can be performed by a computer system. The method can include providing a user interface to a user. The method can further include receiving, via the user interface, definition of a metric indicator comprising metadata associated with the metric indicator. For example, selection of the save button in FIG. 8 can send the values entered via the user interface to the computer system. The method can further include generating a metric indicator detail view including data associated with the metric indicator based on the metadata. The detail view can be, for example, similar to detail view 900 of FIG. 9. The method can further include providing the detail view via the user interface.

The infrastructure can be implemented in various different environments including a cloud environment (could be various types of clouds including private, public, and hybrid cloud environments), on-premises environment, a hybrid environment, and the like.

FIG. 10 depicts a simplified diagram of a distributed system 1000 for implementing an embodiment. In the illustrated embodiment, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In certain embodiments, server 1012 may provide services or software applications that can include non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux®-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain embodiments. For example, one or more of the data repositories 1014, 1016 may be used to store information such as data used to analyze and display in the dashboard. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain embodiments, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1014, 1016 may also be used by applications to store application data. The data repositories used by applications may be of different types such as, for example, a key-value store repository, an object store repository, or a general storage repository supported by a file system.

In certain embodiments, the storage-related functionalities described in this disclosure may be offered as services via a cloud environment. FIG. 11 is a simplified block diagram of a cloud-based system environment 1100 in which various storage-related services may be offered as cloud services, in accordance with certain embodiments. In the embodiment depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, ORACLE JAVA CLOUD SERVICE (JCS), ORACLE DATABASE CLOUD SERVICE (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102.

In some embodiments, the processing performed by cloud infrastructure system 1102 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for JAVA service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a storage-related service offered by cloud infrastructure system 1102. As part of the order, the customer may provide information identifying an application for which the service is to be provided and the application storage profile information for the application.

In certain embodiments, such as the embodiment depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain embodiments, cloud infrastructure system 1102 comprises an identity management subsystem (IMS) 1128 that is configured to manage customers information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

FIG. 12 illustrates an exemplary computer system 1200 that may be used to implement certain embodiments. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 710.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 can be organized into one or more processing units 1232, 1234, etc. A processing unit may include one or more processors, one or more cores from the same or different processors, a combination of cores and processors, or other combinations of cores and processors. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above. In instances where computer system 1200 is executing one or more virtual machines, one or more processing units may be allocated to each virtual machine.

In certain embodiments, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some embodiments. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux® operating systems, a variety of commercially-available UNIX® or UNIX-like operating systems (including without limitation the variety of GNU/Linux® operating systems, the Google Chrome® OS, and the like) and/or mobile operating systems such as iOS®, Windows® Phone, Android® OS, BlackBerry® OS, Palm® OS operating systems, and others.

Computer-readable storage media 1222 may store programming and data constructs that provide the functionality of some embodiments. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include a computer-readable storage media reader 1220 that can further be connected to computer-readable storage media 1222. Reader 1220 may receive and be configured to read data from a memory device such as a disk, a flash drive, etc.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Figure 13:
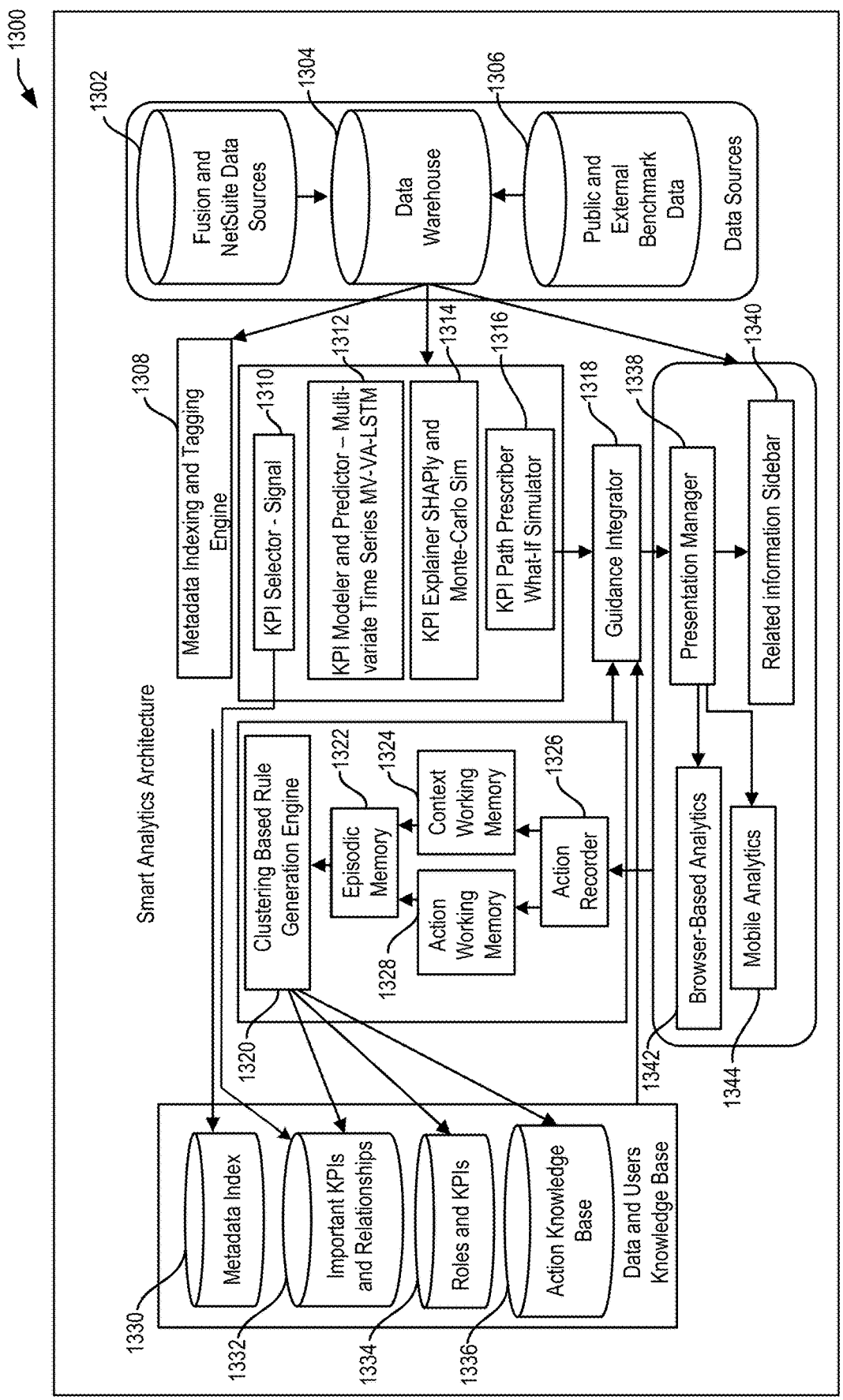
FIG. 13 illustrates an example architecture of a smart analytic system, according to some embodiments.

FIG. 13 illustrates an architecture 1300 and exemplary data flow through a system for creating metric indicator recommendations based on identifying and selecting the highest informational value content for the user. The highest informational value content may be information about metric indicators that have some statistically significant change associated with them or some statistically significant anomaly associated with them over a time period of interest. For example, a KPI with a trend or trend value at a specific time period not in line with the distribution of expectations based on predictions made by a multi-variate time series model may be identified as an anomaly. It may be valuable to provide this information to a user, whether the user asks for that metric indicator or not. Further, users may be limited to specific metric indicators that they can access. For any given user, the relevant metric indicators to which the user has access is considered. For example, if a total profit KPI has an anomaly signal associated with it, but the user does not have access to the total profit KPI, the total profit KPI will not be provided to the user. Further, if a user typically looks at the headcount and attrition KPIs, but there are no anomalies or other signals associated with those KPIs, the KPIs are not always removed from the user's view. Instead, the user behavior may be added to the signal detection to provide additional KPIs for the user to view, so that the user not only sees the KPIs the user would self-select, but also those that have information of value to the user.

The architecture 1300 includes databases 1302, 1304, and 1306. Databases 1302, 1304, and 1306 may be any suitable external data sources to provide enterprise data to the smart analytics system. Database 1302 is an external data source containing data from the company including customer data, sales data, support data, and the like. Database 1306 is data from public and other external sources including, for example, data from the department of labor and the like. Data warehouse 1304 is the data source that is directly accessed by components included in the system. The external data from data sources 1302 and 1306 are used to populate the data source 1304 for the system to use.

Data from data warehouse 1304 is used to identify signal anomalies in KPI selector 1310. KPI selector 1310 can identify metric indicators that may indicate an anomaly signal because, for example, the metric indicator may be trending out of threshold. To identify the metric indicators, for a given metric indicator, the KPI modeler and predictor 1312 may generate a multi-variate dynamic dependency model including but not limited to VARIMAX (Vector Auto Regressive Integrated Moving Average with Exogenous Variables) and multi-variate variable attention temporal attention long short term memory using time-series data for the metric indicator. A prediction of a first set of values of a first variable or attribute of the metric indicator is generated based on the dynamic dependency model. The values from the model may be compared with the actual values to determine if the distribution of values observed is significantly divergent from the forecasted prediction by finding a statistical deviation using divergence tests including but not limited to Kullback-Leibler Divergence Test. If the statistical deviation is significant (e.g., greater than two standard deviations away from the centroid of the distribution) the KPI selector 1310 identifies that metric indicator as being relevant or having some significant information indicating a person should look at it. For that reason, the KPI selector 1310, selects that KPI. If there is nothing anomalous about the metric indicator, then the KPI is not selected for highlighting to the user. Stated differently, a previously forecasted value for the metric indicator may be identified and compared to the current metric indicator value. If the metric indicator value deviates statistically (e.g., by two standard deviations) from the forecasted value over multiple time points, an anomaly is identified. If the metric indicator model suggests an issue or anomaly, the metric indicator may be selected for inclusion in a KPI deck for the user.

In some embodiments, the selected KPIs (metric indicators) may be provided to the guidance integrator 1318 without further analysis. However, in some embodiments, the KPI explainer 1314 can generate an explanation for the anomaly based on the model. For example, the model of the metric indicator, the current metric indicator value, and the value of the contributing variables at that time point can be used to identify the attributes that are significant to the metric indicator at the relevant time. Derivatives of the attributes can be calculated in the model, and those that have the most impact are identified because those with the most impact will have the greatest derivative values based on computational techniques including but not limited to locally interpretable model explanations and Shapley Additive Explanations. The explanation serves as a locally faithful linear model that acts as a surrogate for the original non-linear model. The metric indicator may also be analyzed with machine learning models to determine which metric indicators have statistically significant changes over periods of interest. The percent change or z-score of the metric indicator can be calculated to determine the practical significance of the changes. In some embodiments, the explanation is not generated because, for example, the system cannot converge to a parsimonious explanation or there is not enough data to compute such an explanation.

Once an explanation is generated, the KPI simulator 1316 can generate a recommendation to remedy the signal anomaly. The recommendation can be generated by executing a what-if simulation of the model by changing the identified attributes with the most impact to get to a most or more desired or closest non-anomalous value of the KPI before the anomaly occurred. For example, the what-if simulations may modify the most impactful attributes until the metric indicator value in the model matches that of the prediction. Once the values for the modifications of the attributes can be used to generate the recommendation. The signal anomaly, modeled signal anomaly, explanation, and recommendation may be provided to the guidance integrator 1318.

Metadata indexing and tagging engine 1308 can receive data from data warehouse 1304 and tag or apply metadata to the data, which is then sent to the metadata index database 1330.

The user, upon using the graphical user interface, indicated by browser analytics 1342 generates activities from the creation, use, and viewing of various metric indicators. Each action is recorded by action recorder 1326. The recorded actions are analyzed to extract activity data and context data. The activity data is stored in the activity working memory 1328 and the context data is stored in the context working memory 1324. As an example, if a user logs in and immediately views the headcount metric indicator and then the attrition metric indicator, the activities may be that the KPIs are viewed, in sequence for a length of time, and so forth. The context data may be the time of day, the device, the meeting the user attended during which the user viewed the two metrics, for example. The activity and context data are combined for all related actions performed over, for example, a period of time, to create episodic memory 1322. The episodic memory 1322 is clustered by clustering engine 1320 into similar episodes. The episodic information related to context and data as well as the clusters are stored in the relationship data store 1332, roles and KPIs data store 1334, and action knowledge data store 1336. The user specific use data stored in data stores 1332, 1334, and 1336 is then provided to guidance integrator 1318. Over time, the individual user episodes may reveal patterns, such as that the user always logs in and immediately views the headcount metric and then the attrition metric. Further, over time, clustered data for many users may be captured and used to generate personalization recommendations for users that is based on what many other users do, the KPIs they look at, in which order, and so forth. All of this information can be provided to the guidance integrator.

The guidance integrator 1318 uses the signal anomaly information from the KPI selector 1310 and the KPI modeler and predictor 1312 to generate metric recommendations. In some embodiments, the user specific information is combined to generate a metric recommendation. For example, if the revenue metric has been identified by KPI selector 1310, the user has access to the revenue metric, and the user typically reviews the profit metric. Even if the profit metric did not get captured by the KPI selector 1310, the user may be provided with a decks that includes the revenue metric and the profit metric. The metric recommendation and other information is provided to the presentation manager 1338. The metric recommendation may be provided in the related information sidebar 1340 to the user. This may be, for example, recommendations 315 of FIG. 3 The related information sidebar 1340 may be, for example, related metric indicators 315 shown in FIG. 3. The analytic information (used to generate the metric indicator cards and decks described above) is shown to the user via a graphical user interface. The browser analytics 1342 are shown to a user using a browser interface. The mobile analytics 1344 are shown to the user using a mobile application. The data included in the metric indicators (analytics) are the same data, regardless of whether the interface is a browser or a mobile device.

To display the metric information in the browser-based analytics and/or mobile analytics 144 user interfaces, the graphical representation of the KPIs must be generated. In other words, the KPI card must be generated. For each KPI in the system, a model (for example a Random Forest or XGBoost model) is generated of the metric indicator using KPI modeler and predictor 1312. Each attribute of the metric indicator is included in the model as an independent variable. Using the model, the attributes with the highest entropy change can be identified by, for example, calculating the Shapley Additive Explanations value or local interpretable model-agnostic explanations (LIME) value. When generating the graphical representation of the metric indicator, a card, such as those shown in the exemplary user interfaces herein, including, for example, card 505 of FIG. 5, is generated for the display. The card typically includes some information associated with the attributes that have the highest (greatest) entropy change as identified above. In this way, the most relevant content associated with the metric indicator is provided to the user to view.

Figure 14:
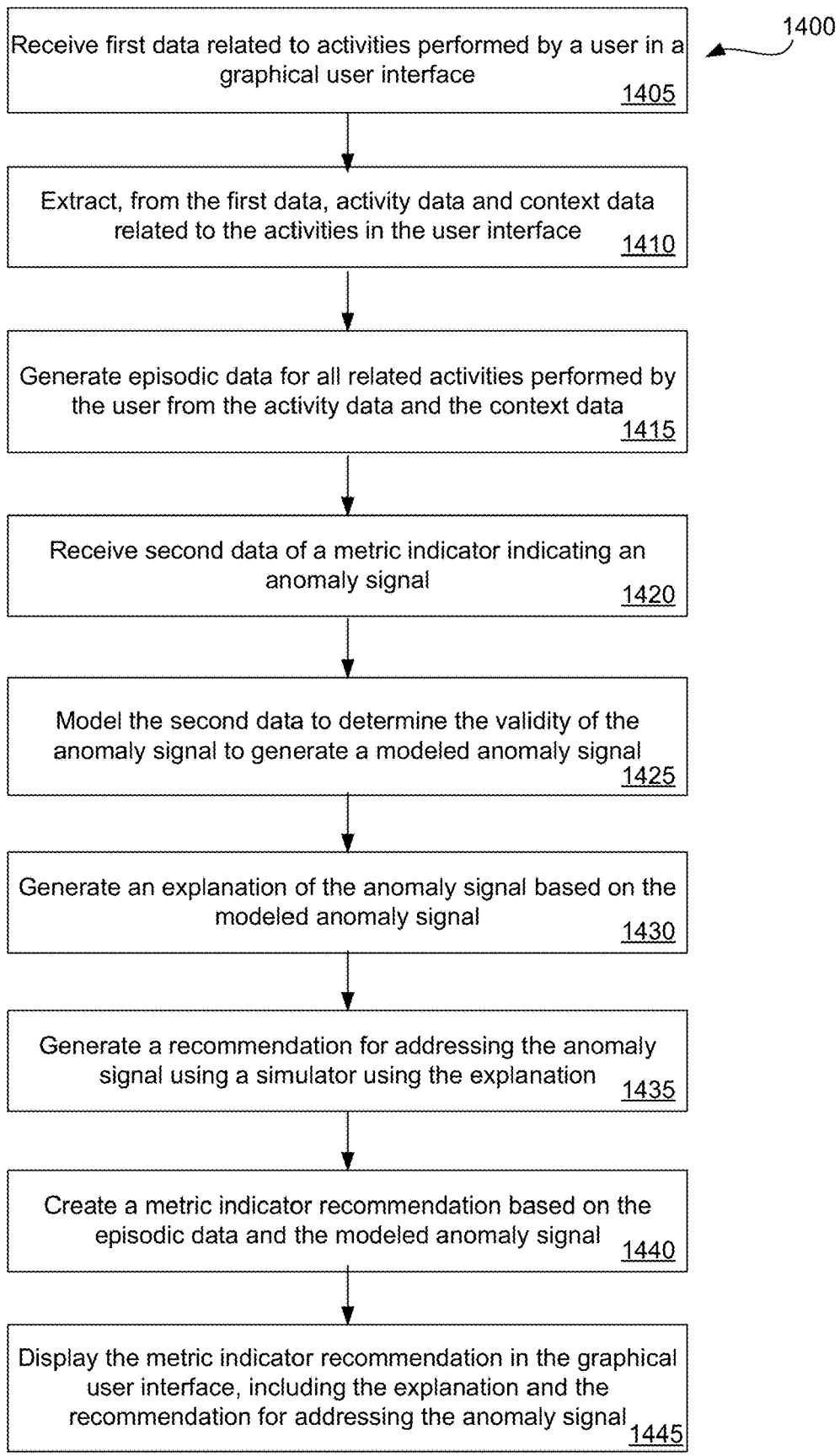
FIG. 14 illustrates an example method for generating metric recommendations, according to some embodiments.

FIG. 14 illustrates a method 1400 that may be performed using a system with architecture 1300 as described in FIG. 13. The method 1400 may begin with step 1405 with the system receiving first data related to activities performed by a user in a graphical user interface. For example, the action recorder 1326 may receive and record the activity data of the user's interaction with the metrics using the browser-based analytics 1342 and/or mobile analytics 1344.

In step 1410, the activity data and context data can be extracted from the first data. For example, the context data can be extracted and stored in context working memory 1324, and the activity data can be extracted and stored in activity working memory 1328. The activity information is directly obtained from the user interactions with the user interface elements in the form of mouse clicks, scrolls, typing in relations to KPIs, Cards, Decks, and the sequence of these actions is stored as a temporal activity graph. Similarly, the context of each of the actions above in terms of its antecedent actions, its consequent actions, the roles and responsibilities of the user, the user's collaborative activity with other users, and the user's sharing and email activity in relation to the KPIs is also stored attached as a graph to each node in the activity graph described above.

In step 1415, episodic data is generated for all related activities performed by the user from the activity data and the context data. Specifically, if a user looks at several related metric indicators, the viewing may be recognized as an episode and stored accordingly.

In step 1420, second data of a metric indicator indicating an anomaly signal is received. For example, the signal anomaly selector 1310 may receive information from data warehouse 1304 regarding a metric indicator that, upon analysis, reveals an anomaly.

In step 1425, the second data is modeled by KPI modeler and predictor 1312 to identify the anomaly signal as described above. For example, the modeler may generate a dynamic dependency model using time-series data for the metric indicator. A prediction of a first set of values of a first variable or attribute of the metric indicator is generated based on the dynamic dependency model. The values from the model may be compared with the actual values to generate a statistical deviation using divergence tests. If the statistical deviation is significant (e.g., two standard deviations as described above) the KPI selector 1310 identifies that metric indicator as being relevant or having some information indicating a person should look at it. This deviation indicates an anomaly, so the signal anomaly is identified and validated.

In step 1430, an explanation of the anomaly signal based on the modeled anomaly signal may be generated. Such explanation may include, for example, factors that have led the metric indicator to trend out of threshold values. The explanation may be found by using the model of the metric indicator and the current metric indicator value to find the derivative of the attributes of the model, where the attributes are each represented as an independent variable within the model. Those attributes having the highest partial derivative are identified as most impactful at the time that the metric indicator value is at that point in time. Those attributes are identified to explain the anomaly using techniques such as Shapley Additive Explanations or Locally Interpretable Model Agnostic Explanations.

In step 1435, a metric indicator recommendation based on the episodic data and the modeled anomaly signal is generated. The recommendation may include steps that may be taken to remedy the anomaly. Specifically, the KPI path prescriber 1316 may generate the recommendation. What-if simulations of the model are run by changing the values of those identified attributes that are most impactful to put the metric indicator value in the most desirable state. For example, if the metric indicator had deviated from a forecasted value, the what-if simulations may attempt to modify the attributes to get the metric value to correspond with the predicted value or a value within the expected distribution.

In step 1440, the metric indicator recommendation is generated and displayed in the graphical user interface, including the explanation and the recommendation for addressing the anomaly signal. The metric recommendation can be displayed in, for example, a sidebar while the user views the metric indicators selected. For example, the metric indicator that is being recommended for viewing may be generated as a card having some values or information such as a graph or value indicating the metric indicator value or values over time in addition to information about the most relevant attributes of the metric indicator as identified by the KPI explainer 1314 and KPI path prescriber 1316. The user interfaces herein provide examples of KPI cards and other information that can be generated for a user to view.

In step 1445, the metric indicator recommendation is displayed in the graphical user interface, including the explanation and the recommendation for addressing the anomaly signal. For example, the visual depiction may be provided in related information sidebar 1340 or more directly on the user's screen. As one example, information box 210 of FIG. 2A provides some notice information including that new hire attrition is at 12%, and one explanation provided is that manufacturing attrition is 4 times higher than the expected rate. This type of information may be helpful for the user to understand why the values are what they are.

Figure 15:
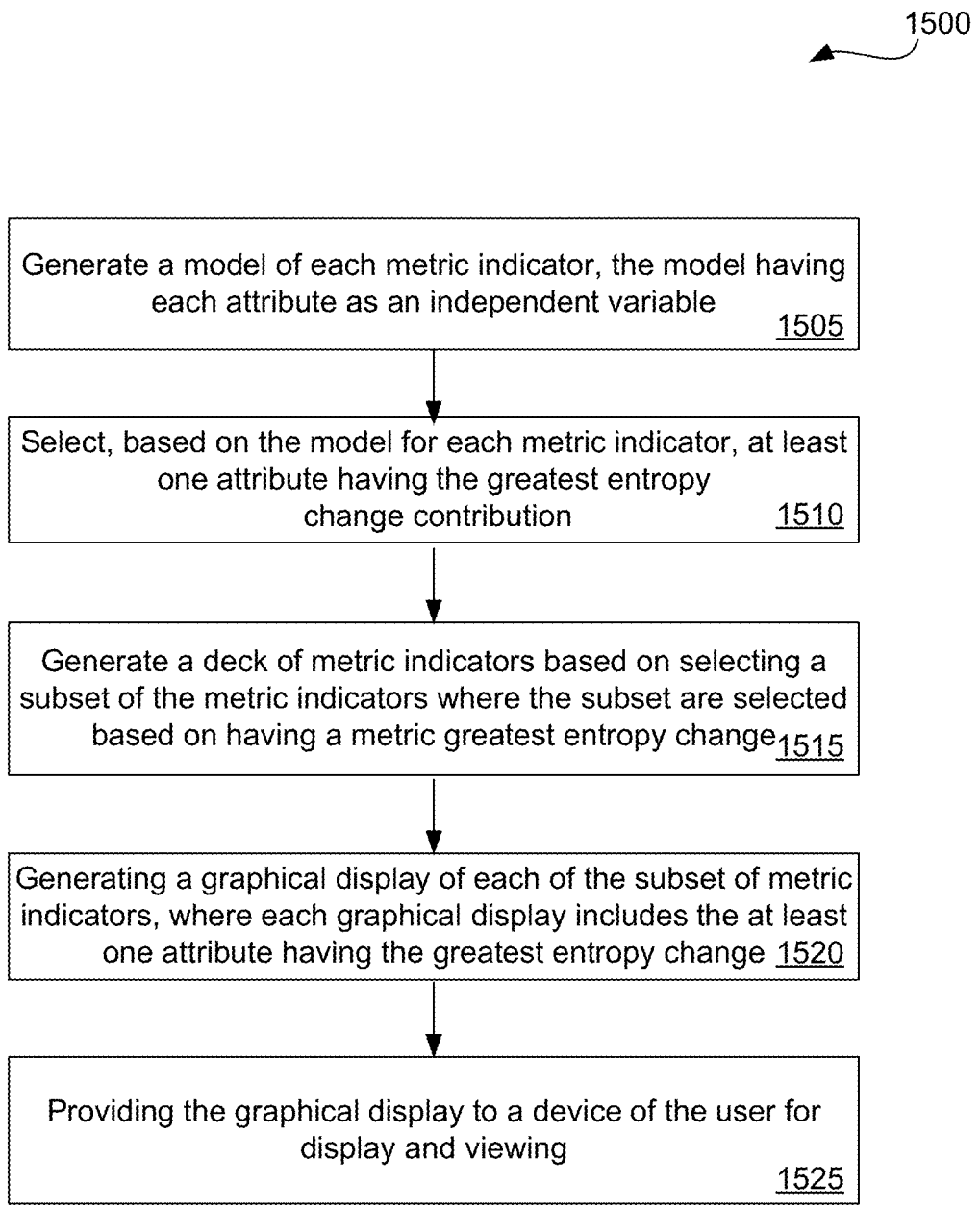
FIG. 15 illustrates an example method for displaying relevant content, according to some embodiments.

FIG. 15 illustrates an example method 1500 for providing high value metric indicators to the user. Method 1500 may be performed by smart analytics system 100 and/or smart analytics architecture 1300, for example. Method 1500 begins with step 1505 with KPI modeler and predictor 1312 generating a model of each metric indicator, the model having each attribute as an independent variable. A model is created for each KPI to identify which of the attributes are most relevant to the KPI, at least during a time period of interest. In this way, a KPI card can be generated for any KPI that may be shown to a user. Note that for a given user, some KPIs may not be available, so the KPIs that are not accessible to the user may not be analyzed at step 1505 in some embodiments.

At step 1510, the KPI selector 1310 may select, based on the model for each metric indicator, at least one attribute having the greatest change contribution. For example, the model generated by the KPI modeler 1312 may be used to take the derivative of each attribute to find that which has the greatest derivative (change contribution). The attributes with the highest change contribution are of most significance or impact on that metric indicator.

At step 1515, the KPI selector 1310 may generate a deck of metric indicators based on selecting a subset of the metric indicators where the subset are selected based on selecting the metrics with the largest statistically significant change. The metrics with the greatest entropy change can be determined by identifying whether the metric indicator may have an anomaly associated with it. As described above, one method of determining whether there is an anomaly with the metric indicator includes generating a dynamic dependency model using time-series data for the metric indicator. A prediction of a first set of values of a first variable or attribute of the metric indicator is generated based on the dynamic dependency model. The values from the model may be compared with the actual values to generate a statistical deviation using statistical divergence tests including but not limited to Kullback-Leibler Divergence test. If the statistical deviation is significant (e.g., equivalent of two standard deviations or more) the KPI selector 1310 identifies that metric indicator as being relevant or having some statistically significant information indicating that a person should look at it. This deviation indicates an anomaly, and those metric indicators having an anomaly are included in the deck of metric indicators. In some embodiments, the user's personalization may also be used to add metric indicators to the deck. For example, if the information in the Important KPIs and relationships database 1332 has information that the specific user prefers some metric indicators for viewing regularly, those KPIs may also be included in the decks. The important KPIs and relationships database 1332 may obtain this user specific information from the clustering engine 1320.

At step 1520, the presentation manager may generate a graphical display of each of the subset of metric indicators, where each graphical display includes at least one attribute having the greatest entropy change. Stated differently, the metric card may include information about the attributes that are most impactful on that metric as identified by the KPI selector 1310 when each KPI was analyzed at 1510.

In some embodiments, the metric indicators are ordered based on statistical significance and/or practical significance. The ordering is done based on the z-score (normalized standard deviation) distance between the observed distribution, and the expected forecasted prediction and the ranking is in descending order. Practical significance is determined based on a product of how rarely the users in the enterprise review anomalies in the area and how large the deviation is in terms of the z-score. Once the metric indicators are ordered and those of highest informational value have been selected (the subset), a graphical display of each of the subset of the metric indicators in order may be generated.

At step 1525, the graphical display of metric indicators, which may be ordered, is provided to the user's display for viewing.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

The invention claimed is:

1. A computer-implemented method for identifying and displaying high informational content to a user, comprising:
for each metric indicator of a plurality of metric indicators of an enterprise:
training a model of the metric indicator using a machine learning process, the model having each attribute of a plurality of attributes of the metric indicator as independent variables of the model and configured to calculate derivatives for each of the plurality of attributes; and
selecting, based on the model, at least one attribute of the plurality of attributes having a greatest statistical change contribution using the model of the metric indicator, wherein the greatest statistical change contribution is based on the derivatives calculated by the model;
selecting a subset of the plurality of metric indicators from the plurality of metric indicators that have a greatest metric entropy change;
generating a deck of metric indicators based on the subset of the plurality of metric indicators;
generating a graphical display of each of the subset of the plurality of metric indicators, wherein each graphical display of the subset of the plurality of metric indicators comprises the at least one attribute of the plurality of attributes; and
providing the graphical display to a device of the user for display to the user.

2. The computer-implemented method of claim 1, wherein selecting a subset of the plurality of metric indicators comprises:
obtaining a previous forecast of a current metric indicator;
determine a current value of the metric indicator; and
select the metric indicator when the previous forecast is different than the current value.

3. The computer-implemented method of claim 1, the method further comprising:
generating an explanation of the greatest metric entropy change for the subset of the plurality of metric indicators by applying a current value of the metric indicator to the model, generating a partial derivative with respect to each of the plurality of attributes of the model, and selecting a subset of each of the plurality of attributes based on the generated partial derivative.

4. The computer-implemented method of claim 3, the method further comprising:
running a what-if simulation of the model by changing values of the selected subset of each of the plurality of attributes to change the value of the metric indicator.

5. The method of claim 1, the method further comprising:
recording actions of the user within a user interface;
generating user preference information of at least one metric indicator; and
wherein generating a deck of metric indicators comprises including the at least one metric indicator in the deck of metric indicators.

6. The method of claim 1, wherein generating a graphical display of each of the subset of the plurality of metric indicators comprises:
creating a metric card comprising at least one visual depiction of the at least one attribute.

7. The method of claim 1, further comprising:
identifying a second subset of the plurality of metric indicators to which the user has access; and
selecting the subset of the plurality of metric indicators from the second subset of the plurality of metric indicators.

8. The method of claim 1, further comprising:
tracking usage behavior of a plurality of users using the user interface;
identifying trend data about each of the plurality of metric indicators based on the usage behavior of the plurality of users;
generating a graphical trend card comprising a visual depiction of the trend data; and
providing the graphical trend card to one or more users of the plurality of users in the user interface.

9. A system, comprising:
one or more processors; and
a memory having stored thereon instructions that, when executed by the one or more processors, causes the one or more processors to perform operations comprising:
for each metric indicator of a plurality of metric indicators of an enterprise:
training a model of the metric indicator using a machine learning process, the model having each attribute of a plurality of attributes of the metric indicator as independent variables of the model and configured to calculate derivatives for each of the plurality of attributes; and
selecting, based on the model, at least one attribute of the plurality of attributes having a greatest statistical change contribution using the model of the metric indicator, wherein the greatest statistical change contribution is based on the derivatives calculated by the model;
selecting a subset of the plurality of metric indicators from the plurality of metric indicators that have a greatest metric entropy change;
generating a deck of metric indicators based on the subset of the plurality of metric indicators;
generating a graphical display of each of the subset of the plurality of metric indicators, wherein each graphical display of the subset of the plurality of metric indicators comprises the at least one attribute of the plurality of attributes; and
providing the graphical display to a device of a user for display to the user.

10. The system of claim 9, wherein the operations further comprise:
generating a dynamic dependency model using time-series data for each of the plurality of metric indicators.

11. The system of claim 10, wherein the operations further comprise:

generating predictions of attribute values for each of the plurality of metric indicators using the dynamic dependency models.

12. The system of claim 11, wherein the operations further comprise:
   comparing the predictions of attribute values with actual attributes values to generate a statistical deviation using a divergence test for the actual attribute values.

13. The system of claim 12, wherein selecting the subset of the plurality of metric indicators from the plurality of metric indicators that have a greatest metric entropy change comprises:
   identifying the subset of the plurality of indicators as having a significant statistical deviation between the predictions of the attribute values and the actual attributes values.

14. The system of claim 13, wherein selecting the subset of the plurality of metric indicators from the plurality of metric indicators further comprises:
   selecting the subset of the plurality of metric indicators based on a user preference for metric indicators that have previously been viewed regularly.

15. A non-transitory computer-readable medium comprising instructions that, when executed by one or more processors, cause the one or more processors to perform operations comprising:
   for each metric indicator of a plurality of metric indicators of an enterprise:
      training a model of the metric indicator using a machine learning process, the model having each attribute of a plurality of attributes of the metric indicator as independent variables of the model and configured to calculate derivatives for each of the plurality of attributes; and
      selecting, based on the model, at least one attribute of the plurality of attributes having a greatest statistical change contribution using the model of the metric indicator, wherein the greatest statistical change contribution is based on the derivatives calculated by the model;
   selecting a subset of the plurality of metric indicators from the plurality of metric indicators that have a greatest metric entropy change;
   generating a deck of metric indicators based on the subset of the plurality of metric indicators;
   generating a graphical display of each of the subset of the plurality of metric indicators, wherein each graphical display of the subset of the plurality of metric indicators comprises the at least one attribute of the plurality of attributes; and
   providing the graphical display to a device of a user for display to the user.

16. The non-transitory computer-readable medium of claim 15, wherein the deck of metric indicators comprises a collection of graphical cards that provide data associated with the subset of metric indicators.

17. The non-transitory computer-readable medium of claim 16, wherein graphical display of each of the subset of the plurality of metric indicators comprises a graphical dashboard displaying the collection of graphical cards.

18. The non-transitory computer-readable medium of claim 16, wherein the collection of graphical cards display graphs of the data associated with the subset of metric indicators, wherein a type of the graphs is determined automatically by a user preference.

19. The non-transitory computer-readable medium of claim 16, wherein the collection of graphical cards display actual attribute values and predicted attribute values.

20. The non-transitory computer-readable medium of claim 15, wherein training data for the models of the metric indicators is selected from data stored in a data warehouse for the enterprise.

* * * * *

UNITED STATES PATENT AND TRADEMARK OFFICE
CERTIFICATE OF CORRECTION

PATENT NO. : 11,367,034 B2  
APPLICATION NO. : 16/586347  
DATED : June 21, 2022  
INVENTOR(S) : Chintalapati et al.

Page 1 of 2

It is certified that error appears in the above-identified patent and that said Letters Patent is hereby corrected as shown below:

On the Title Page

On page 2, Column 2, under Other Publications, Line 20, delete "Wikipedia, , Available" and insert -- Wikipedia, Available --, therefor.

On page 2, Column 2, under Other Publications, Line 32, delete "Eectrical and Eectronics" and insert -- Electrical and Electronics --, therefor.

On page 3, Column 1, under Other Publications, Line 3, delete "Allow ance" and insert -- Allowance --, therefor.

In the Drawings

On sheet 6 of 16, in FIG. 5, Line 2, delete "Merketing" and insert -- Marketing --, therefor.

Figure 7:
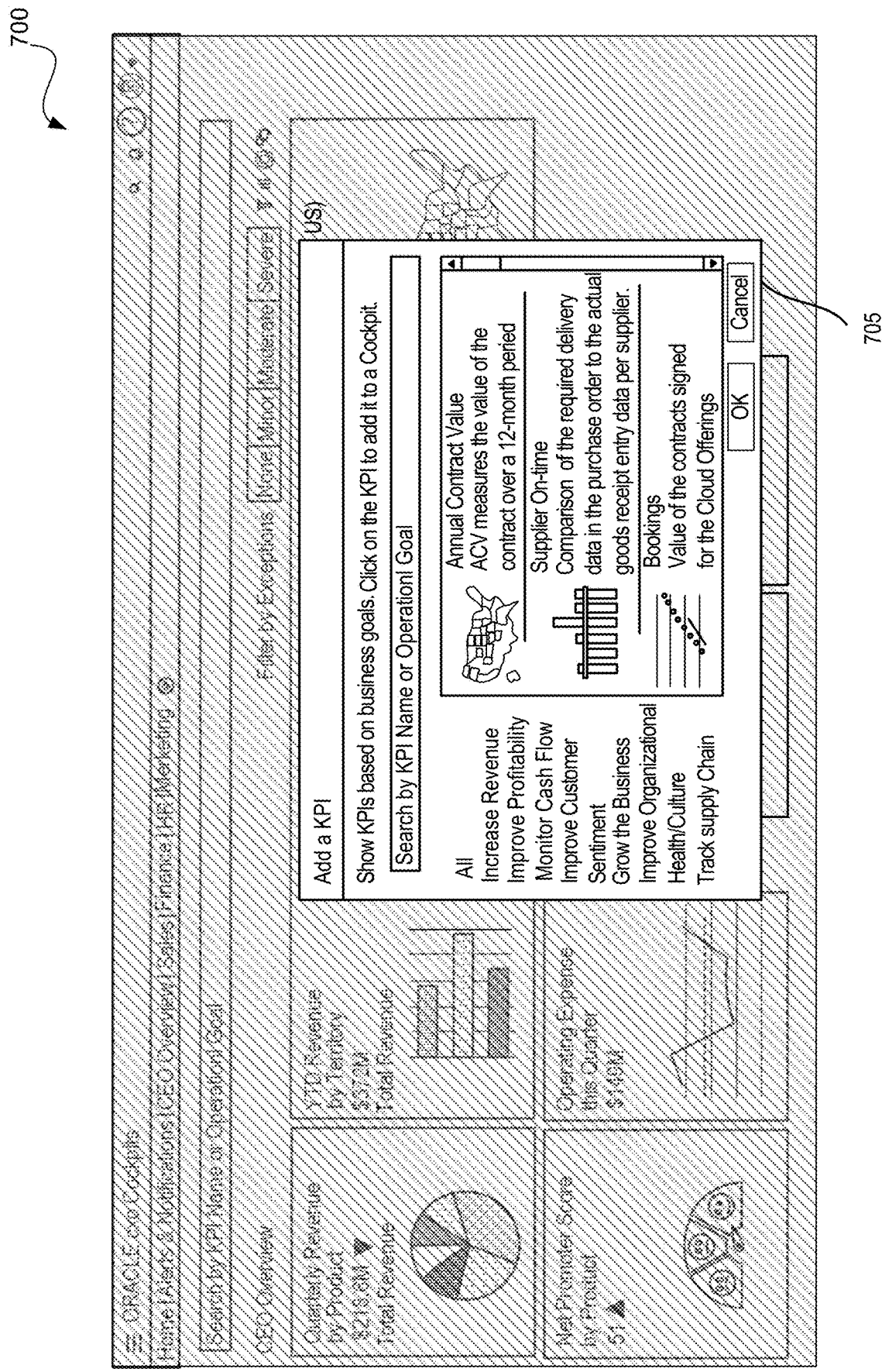
FIG. 7 illustrates an example user interface for adding a KPI, according to some embodiments.

On sheet 8 of 16, in FIG. 7, Line 2, delete "Merketing" and insert -- Marketing --, therefor.

On sheet 8 of 16, in FIG. 7, Line 7, delete "Operationl" and insert -- Operational --, therefor.

On sheet 8 of 16, in FIG. 7, Line 10, delete "peried" and insert -- period --, therefor.

On sheet 9 of 16, in FIG. 8, Line 4, delete "persoae" and insert -- persona --, therefor.

On sheet 9 of 16, in FIG. 8, Line 12, delete "Observatons" and insert -- Observations --, therefor.

On sheet 10 of 16, in FIG. 9, Line 2, delete "Merketing" and insert -- Marketing --, therefor.

On sheet 10 of 16, in FIG. 9, Line 3, delete "Operationl" and insert -- Operational --, therefor.

Signed and Sealed this  
Twenty-seventh Day of December, 2022

Katherine Kelly Vidal  
*Director of the United States Patent and Trademark Office*

CERTIFICATE OF CORRECTION (continued)
U.S. Pat. No. 11,367,034 B2

In the Specification

In Column 7, Line 36, delete "he metric" and insert -- the metric --, therefor.

In Column 8, Line 29, delete "may by" and insert -- may be --, therefor.

In Column 15, Line 42, delete "infra-red" and insert -- infrared --, therefor.

In Column 24, Line 4, delete "evolution)" and insert -- evolution)) --, therefor.